US012054812B2

(12) United States Patent
Ramakrishnan et al.

(10) Patent No.: US 12,054,812 B2
(45) Date of Patent: Aug. 6, 2024

(54) MAGNESIUM ALLOY

(71) Applicant: MRL MATERIALS RESOURCES LLC, Beavercreek, OH (US)

(72) Inventors: Abhishek Ramakrishnan, Beavercreek, OH (US); Daniel P. Satko, Centerville, OH (US); Ayman A. Salem, Dayton, OH (US)

(73) Assignee: MRL Materials Resources LLC, Beavercreek, OH (US)

(*) Notice: Subject to any disclaimer, the term of this patent is extended or adjusted under 35 U.S.C. 154(b) by 34 days.

(21) Appl. No.: 17/738,648

(22) Filed: May 6, 2022

(65) Prior Publication Data

US 2023/0044652 A1 Feb. 9, 2023

Related U.S. Application Data

(60) Provisional application No. 63/185,825, filed on May 7, 2021.

(51) Int. Cl.
| | |
|---|---|
| C22C 23/06 | (2006.01) |
| B22F 10/25 | (2021.01) |
| B22F 10/28 | (2021.01) |
| B22F 10/64 | (2021.01) |
| B33Y 10/00 | (2015.01) |

(Continued)

(52) U.S. Cl.
CPC .............. *C22C 23/06* (2013.01); *B22F 10/25* (2021.01); *B22F 10/28* (2021.01); *B22F 10/64* (2021.01); *B33Y 40/20* (2020.01); *C22C 1/04* (2013.01); *C22C 1/0408* (2013.01); *B33Y 10/00* (2014.12); *B33Y 30/00* (2014.12); *B33Y 40/00* (2014.12); *B33Y 70/00* (2014.12); *B33Y 80/00* (2014.12); *Y02P 10/25* (2015.11)

(58) Field of Classification Search
CPC ......... C22C 23/06; C22C 1/04; C22C 1/0408; B22F 10/28; B22F 10/25; B22F 10/64; B33Y 10/00; B33Y 30/00; B33Y 40/00; B33Y 70/00; B33Y 80/00; B33Y 40/20; Y02P 10/25
See application file for complete search history.

(56) References Cited

U.S. PATENT DOCUMENTS

| | | | |
|---|---|---|---|
| 2017/0072103 A1* | 3/2017 | Bhaduri | ................ A61L 29/106 |
| 2019/0153570 A1* | 5/2019 | Zhou | ....................... A61L 31/02 |
| 2022/0154315 A1* | 5/2022 | Almgren | ................ C22C 23/02 |

* cited by examiner

*Primary Examiner* — Adil A. Siddiqui
(74) *Attorney, Agent, or Firm* — Thomas E. Lees, LLC

(57) ABSTRACT

Magnesium alloys and a process of manufacturing an article using magnesium alloys. During additive manufacturing, where the magnesium alloy is being deposited in a layer-by-layer manner, solidification of the melted portion of a deposited layer is performed in such a way as to ensure that about 15 percent or more of the portion being solidified includes a non-equilibrium eutectic constituent. This in turn reduces the likelihood of encountering solidification conditions that otherwise would lead to hot tearing problems. Further, upon subsequent heat treatment of the solidified layer, the eutectic constituents that were used for hot tearing resistance are dissolved so that the solidified layer may be returned to a substantially single-phase magnesium matrix such that desirable material properties such as improved flammability point, improved corrosion resistance and one or more of high yield strength, ultimate tensile strength and elongation are promoted.

9 Claims, 17 Drawing Sheets

(51) Int. Cl.
  *B33Y 30/00* (2015.01)
  *B33Y 40/00* (2020.01)
  *B33Y 40/20* (2020.01)
  *B33Y 70/00* (2020.01)
  *B33Y 80/00* (2015.01)
  *C22C 1/04* (2023.01)

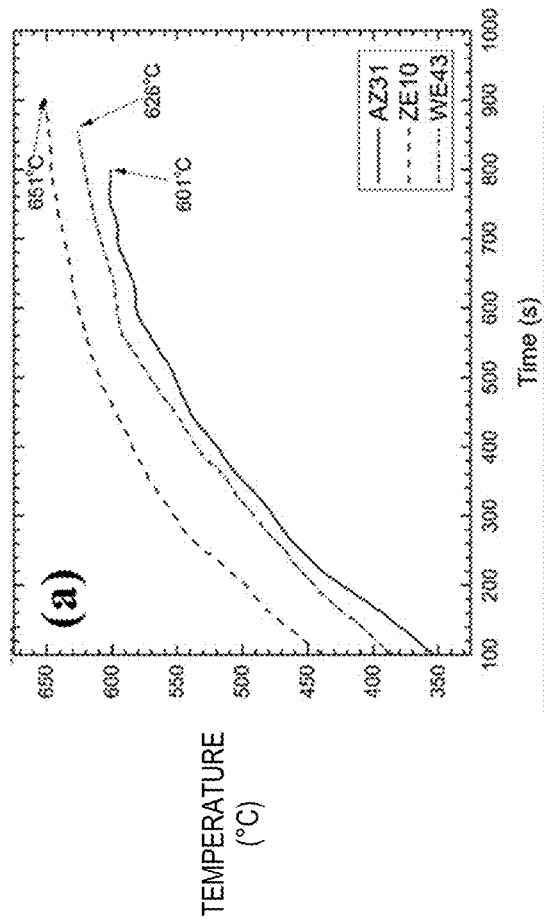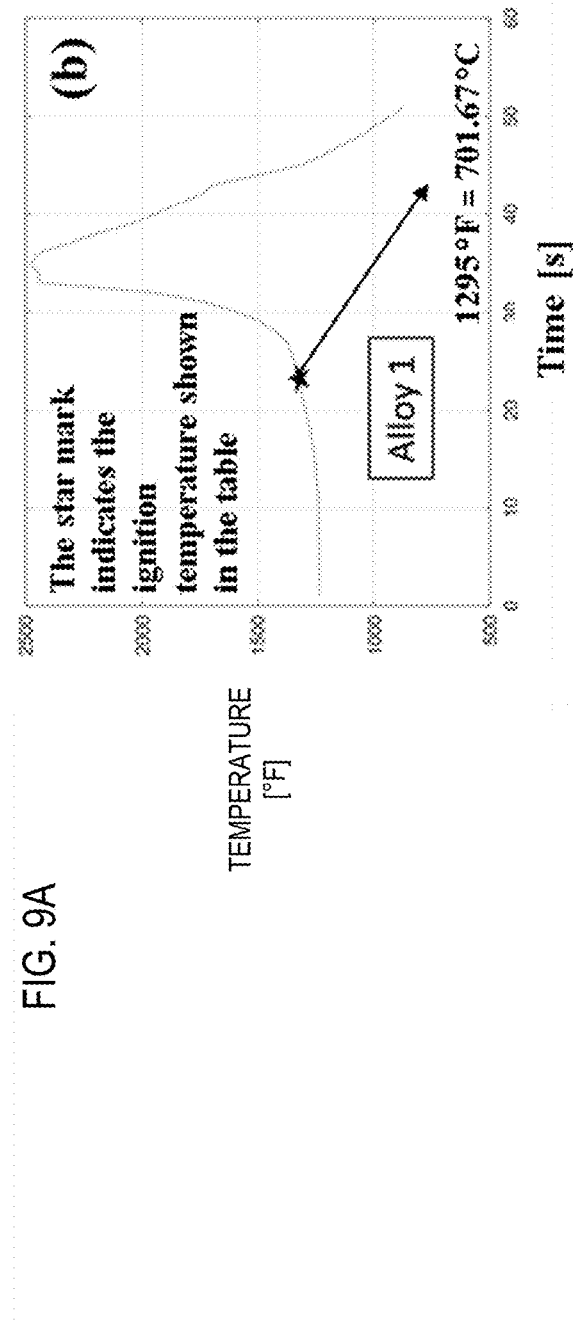
FIG. 9A
FIG. 9B

MAGNESIUM ALLOY

This application claims priority to U.S. Provisional Application Ser. No. 63/185,825 that was filed on May 7, 2021.

STATEMENT REGARDING FEDERALLY SPONSORED RESEARCH OR DEVELOPMENT

The subject matter of the present disclosure was made with government support under N68335-21-C-0090 awarded by the Navy. The government has certain rights in such subject matter.

TECHNICAL FIELD

The present disclosure relates generally to magnesium (Mg) alloys, and more particularly to Mg alloys that are suitable for use with additive manufacturing (AM) processes.

BACKGROUND

AM refers to various processes that employ fusion-based (also referred to as beam-based, where the energy source may be a laser, electron beam, weld torch or the like) or deformation-based processes in which material is deposited, joined or solidified in a selective, layered fashion to create or repair a near net shape three-dimensional object. In common parlance, the term "AM" may be used in a manner consistent with its definition in ASTM F2792-12a entitled "Standard Terminology for Additively Manufacturing Technologies". Examples of AM processes include three-dimensional (3D) printing, electron beam sintering, electron beam melting, direct metal deposition, laser engineered net shaping, directed energy deposition (DED), laser metal deposition (LMD), stereolithography, selective laser sintering (SLS), direct metal laser sintering (DMLS), selective laser melting (SLM), electron beam melting (EBM) and laser powder bed fusion (LPBF). AM may also include wire extrusion technologies such as fused filament fabrication (FFF), among others. A non-exhaustive list of some commercially-available AM systems include the 3D Systems Pro-X300 (USA), Directed Energy Deposition System by Beam Machine (USA) and the EOSINT M 280 DMLS AM System, available from EOS GmbH of Munich, Germany.

While AM possesses some benefits relative to traditional manufacturing approaches, they have heretofore been unsatisfactory for the repair or manufacture of components that use high-performance magnesium-aluminum (Mg—Al) alloys. Traditionally, these alloys are optimized for use as wrought processes and as such lack certain properties that are needed for AM. For example, in the rapid solidification that is associated with certain forms of AM, the normal cooling-related shrinkage and thermal contraction of a heated material in a semi-solid state becomes obstructed along grain boundaries that are not fed with sufficient material that is still in its liquid state and has yet to cool and solidify. This in turn results in significant increases in residual stresses that render these alloys (with their relatively large coefficients of thermal expansion) highly susceptible to hot tearing, where cracking occurs in the final stages of solidification due to the solid phase being torn apart along the interdendritic liquid films that are present.

While there are commercial alloys (such as AZ91D, WE41, AZ31 and AMX602) that include improvement in hot tearing resistance for weldability purposes, their improved processability comes with a significant sacrifice in mechanical properties over their structural alloy counterparts such as WE43 and AZ91. Other classes of Mg alloys, such as the die-cast Mg—Al-rare earth (Mg—Al-RE) alloys, have been designed to resist hot cracking to allow for use as castings. In grades of Mg—Al alloys such as these, one or more eutectic reactions that take place during solidification are believed to improve processability that in turn contributes to improved hot tear resistance. Unfortunately, the eutectic constituents (usually Laves phase) are of considerable fraction and are an equilibrium (insoluble), non-strengthening phase that results in significantly inferior properties relative to their high-strength wrought grade counterparts.

SUMMARY

The authors of the present disclosure have discovered that using certain AM-based component processes in conjunction with Mg—Al alloys that have well-defined minimum and maximum percentages of additional elements can significantly improve numerous alloy mechanical and structural properties for the component. Furthermore, authors of the present disclosure have discovered that such alloys are useful in either new component fabrication or existing component repair processes. Examples of such improved properties include hot tear-resistance, mechanical properties, corrosion resistance and flammability. Furthermore, the authors of the present disclosure have discovered that AM is best considered a combination of micro-welding and micro-casting, and that from this the integration of a couple of factors in the form of design constraints are required in order to optimize both the alloy and process selected. Significant among these is first the need to ensure the presence of non-equilibrium eutectic phases during solidification of an AM layer and second that by subsequently removing these eutectic phases and re-introducing a substantially single-phase structure after solidification of each layer, both the solidification dynamics and material properties can be controlled in order to increase hot tearing resistance and other desirable properties.

According to an aspect of the present disclosure, a Mg (also referred to herein as Mg-based) alloy configured for use in AM has, by weight, about 0% to about 6% neodymium (Nd), 0% to about 1% zirconium (Zr), 0% to about 8% yttrium (Y), 0% to about 16% erbium (Er), 0% to about 16% calcium (Ca), 0% to about 1% gadolinium (Gd) and 0% to about 1% manganese (Mn). In some embodiments, the balance can comprise—in addition to Mg—one or more of incidental elements and impurities. In some embodiments, upon solidification from the AM process, the just-deposited layer of the alloy has a measurable amount (for example, about 15%) of non-equilibrium (soluble) eutectic constituents to give it improved resistance to hot tearing. Upon subsequent heat treating, the coarse eutectic constituents can then be completely dissolved in order to restore the layer of the solidified alloy to a single-phase Mg matrix that is substantially eutectic-free.

In certain embodiments, the alloy contains a selected percent of soluble Laves phase eutectic for hot tearing resistance, and a selected percent $Mg_{24}R_5$-phase precipitated at a selected temperature for high strength, where R is Ca, Y, Er or Gd. For instance, the Mg alloy can contain about 0.8% of soluble Laves phase eutectic, and greater than 6% of $Mg_{41}R_5$-Phase precipitated at about 250° Celsius (C). Moreover, in some embodiments, the Mg alloy contains a selected percent of soluble Laves phase eutectic, and a selected percent $Mg_{41}R_5$-phase precipitated at a selected temperature, where R is Ca, Y, Er or Gd. For instance, the Mg alloy can contain about 0.8% of soluble Laves phase eutectic, greater than 0.1% of $Mg_{41}R5$-phase precipitated at about 250° C. In some embodiments, the Mg alloy contains above 1% of large β' and fine β"-phase precipitate phases, where β' is $Mg_{12}$ (Y, Nd or Er) and β" $Mg_3$ (Y, Nd, Er or Gd), respectively, dynamically precipitated at a selected temperature for high strength that proceeds as follows: α-Mg→β"→β'→β $(Mg_3R)$→$Mg_{24}R_5$→$Mg_{41}R_5$.

According to another aspect of the present disclosure, an alloy has, by weight, any one or more of the following: 0% to about 6% Nd, 0% to about 1% Zr, 0% to about 8% Y, 0% to about 16% Er, 0% to about 16% Ca and 0% to about 1% Gd. A more particular embodiment of the alloy includes having about 2% Er, about 0.1% Ca, about 5.37% Y, about 3.337% Nd, 0.477% Gd and about 0.603% Zr. Another more particular embodiment of the alloy includes having about 5% Er, about 0.1% Ca, about 4.317% Y, 2.682% Nd, 0.383% Gd and about 0.485% Zr. Another more particular embodiment of the alloy includes having about 8% Er, about 0.1% Ca, about 3.264% Y, 2.028% Nd, 0.290% Gd and about 0.366% Zr. Another more particular embodiment of the alloy includes having about 2% Er, about 0.5% Ca, about 5.266% Y, 3.272% Nd, 0.467% Gd and about 0.591% Zr. Another more particular embodiment of the alloy includes having about 5% Er, about 0.5% Ca, about 4.212% Y, 2.618% Nd, 0.374% Gd and about 0.473% Zr; about 8% Er, about 0.5% Ca, about 3.159% Y, 1.963% Nd, 0.28% Gd, about 0.355% Zr. Another more particular embodiment of the alloy includes having about 2% Er, about 2% Ca, about 4.874% Y, 3.029% Nd, 0.433% Gd and about 0.547% Zr. Another more particular embodiment of the alloy includes having about 5% Er, about 2% Ca, about 3.821% Y, 2.374% Nd, 0.339% Gd and about 0.429% Zr. Another more particular embodiment of the alloy includes having about 8% Er, about 2% Ca, about 2.768% Y, 1.72% Nd, 0.246% Gd and about 0.311% Zr. Another more particular embodiment of the alloy incorporates one or more β"→β'→β $(Mg_3R)$→$Mg_{24}R_5$→$Mg_{41}R^5$ precipitate phases, where R is Ca, Y, Er, Gd or Nd.

According to another aspect of the present disclosure, an alloy consists of, by weight, 3% to about 6% Nd, 0% to about 1% Zr, 4% to about 8% Y, 0% to about 16% Er, 0% to about 16% Ca and 0.5% to about 1% Gd. In some embodiments, the balance of weight percent is Mg, incidental elements and impurities. A more particular embodiment of the alloy includes having about 2% Er, about 0.1% Ca, about 8% Y, 6% Nd, 0.971% Gd and about 0.98% Zr. Another particular embodiment of the alloy includes having about 5% Er, about 0.1% Ca, about 7% Y, 5% Nd, 0.74% Gd and about 0.85% Zr. Another particular embodiment of the alloy includes having about 8% Er, about 0.1% Ca, about 6% Y, 4.3% Nd, 0.246% Gd and about 0.7% Zr. Another particular embodiment of the alloy includes having about 2% Er, about 0.5% Ca, about 7.541% Y, 5.47% Nd, 0.971% Gd and about 0.9% Zr. Another particular embodiment of the alloy includes having 5% Er, about 0.5% Ca, about 7% Y, 5.42% Nd, 0.7% Gd and about 0.812% Zr. Another particular embodiment of the alloy includes having about 8% Er, about 0.5% Ca, about 6.24% Y, 4.68% Nd, 0.246% Gd and about 0.7% Zr. Another particular embodiment of the alloy includes having about 2% Er, about 2% Ca, about 6.75% Y, 4.25% Nd, 0.681% Gd and about 0.92% Zr. Another particular embodiment of the alloy includes having about 5% Er, about 2% Ca, about 6.431% Y, 4.26% Nd, 0.61% Gd and about 0.689% Zr. Another particular embodiment of the alloy includes having about 8% Er, about 2% Ca, about 6.13% Y, 4.124% Nd, 0.51% Gd and about 0.6% Zr.

According to yet another aspect of the present disclosure, a method of assembling an article includes depositing a layer of powdered feedstock material onto a platform of an AM system, fusing at least a portion of the deposited layer, solidifying the fused portion of the deposited layer such that at least about 10 to 15 percent of the portion being solidified comprises a non-equilibrium eutectic constituent and returning the solidified layer to a substantially single-phase Mg matrix by heat treating. In this way, a substantial entirety of the non-equilibrium eutectic constituent that developed during the solidifying is dissolved prior to repeating the depositing, fusing, solidifying and heat treating steps. This approach continues until the article has been assembled. While the currently-observed property improvements for the Mg alloys disclosed herein generally correspond to alloy mixtures with eutectic phases of between about 10 and 15 percent, the authors of the present disclosure envision the possibility of such improvements to extend to other ranges, as well as more particular ranges within the presently-disclosed boundaries, and that further thermodynamic calculations may reveal other such ranges all of which are deemed to be within the scope of the present disclosure. For example, the maximum eutectic may correspond to about 15 percent; however, as can been seen from FIG. 2 (that will be discussed in more detail as follows), it can be interpreted that the eutectic composition can be as low as about 2.0 percent and still prevent hot tearing or cracking. In one form, the alloy consists of, by weight, 0% to about 6% Nd, 0% to about 1% Zr, 0% to about 8% Y, 0% to about 16% Er, 0% to about 16% Ca, 0% to about 1% Gd, 0% to about 1% Mn and the balance being Mg and incidental elements and impurities.

A more particular embodiment of the AM system includes a powdered feedstock source to contain the powdered feedstock material, a material flowpath that is in fluid communication with the powdered feedstock source, a beam energy source with which to perform the fusing and a controller with which to coordinate the operation of at least the powdered feedstock source, material flowpath and beam energy source. In one form of an even more particular embodiment of the AM system includes having the powdered feedstock material formed as a powdered alloy prior to introducing it into the material flowpath, while another form the powdered feedstock material is formed as a powdered alloy only once it has been introduced into the material flowpath. Another more particular embodiment of the AM system includes at least one hopper as at least a part of the powdered feedstock source, and in an even more particular form as numerous hoppers. More particularly still, each of the numerous hoppers contain a different powdered feedstock material such that upon mixing in the material flowpath they form into a powdered alloy. A more particular embodiment of the method includes having at least one of minimizing an as-built grain size, minimizing a freezing range of the Mg alloy, maximizing the solidus temperature and minimizing second-phase precipitation during layer solidifying.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

FIGS. 9A through 9D depict thermocouple data from flammability experiments conducted on some of the Mg alloys of the present disclosure as well as for a couple of legacy alloys;

DETAILED DESCRIPTION

Figure 1:
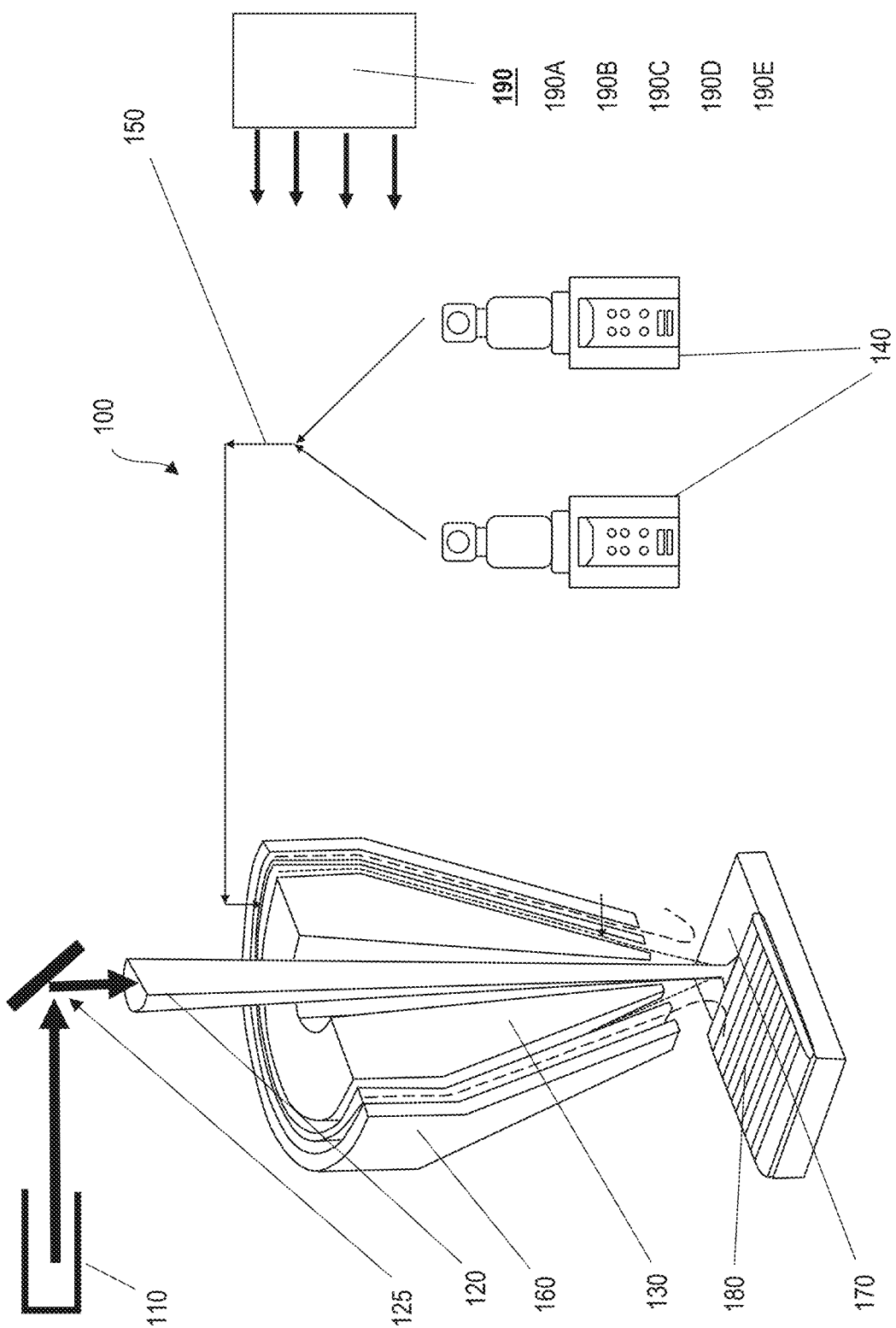
FIG. 1 depicts a high throughput AM process for Mg-based alloy development according to an aspect of the present disclosure.

A technical problem relates to understanding the dynamics of eutectic phase precipitation and its impact on certain properties of an Mg-based alloy being formed. It is understood that eutectic solidification occurs in an alloy when a single liquid phase decomposes into two solid phases which are in equilibrium with the liquid at the eutectic temperatures. More particularly, eutectic solidification occurs when crystallization of one phase starts by nucleation; this phase solidifies until the resulting change in the composition of the liquid is sufficient to cause the other phase to nucleate. The second phase then grows and the process is reversed. Stated another way, the eutectic process commences with the formation of a nucleus of one of the phases where a crystal of the formed phase will grow until the surrounding liquid has become rich enough in the other constituent for the second phase to nucleate. Subsequently, the two initial crystals that form in this way will grow side by side. If growth is radial, each crystal will grow wider as it expands outward from its point of nucleation. The extent to which the crystals can grow wider depends on the speed of growth, since diffusion in the liquid is necessary to keep the surface of each phase supplied with appropriate atoms for continuous solidification. The greater the speed of solidification, the less will be the maximum thickness of the lamellae that are associated with the most common type of eutectic structure. This lower thickness lamellar structure results in the alternate solidification of the two phases. As such, eutectic growth is controlled essentially by (1) the solute diffusion processes which are necessary to drive the solidification front and (2) capillarity forces, both of which determine the spacing of the precipitating secondary phases.

This technical problem further manifests itself in the way that traditional aspects of eutectic growth theory were applied. In particular, consideration of such growth was only given to low growth rate regimes, leaving high growth rate (large Peclet number) modalities—such as that which accompanies the laser-based alloy treatment disclosed herein—without a suitable understanding of eutectic formation and growth. Moreover, the authors of the present disclosure discovered that merely considering scenarios where the velocities were large for the diffusion field but not large enough to alter the boundary condition due to the nonequilibrium effects at the solid-liquid interface is not sufficient for an accurate understanding of the growth dynamics. Furthermore, the authors of the present disclosure discovered that taking into consideration the maximum velocity up to which a stable cooperative growth can take place was smaller than the growth rate at which nonequilibrium effects, while potentially significant, does not alone account for situations where eutectic systems can be grown with sufficiently high velocities and yet where nonequilibrium effects at the interface become important. As such, a more particular technical problem relates to how to use Mg-based alloys in a rapid-solidification AM process without encountering significant cracking and the ensuing limitations on material properties.

In this regard, aspects of the present disclosure provide a technical solution that improves one or more material figures of merit through manipulating various interdependent design constraints, including 1) maximizing the amount of eutectic formed at the last stages of solidification, 2) minimizing as-built grain size, 3) minimizing the alloy freezing range, 4) maximizing the solidus temperature and 5) minimizing second-phase precipitation during cooling in the solid-state. The alloys disclosed herein were designed with integrated computational materials engineering (ICME) tools and the CALPHAD (CALculation of PHAse Diagrams) approach, enabling quantitative prediction of precipitate phase fraction, yield strength, hot tearing index, and Scheil (i.e., non-equilibrium) freezing range for arbitrary alloy compositions. With these tools, alloy compositions were optimized according to these five design constraints.

Significantly, a positive technical effect takes place when Mg alloys are configured with optimal solidification behavior consistent with a particular AM process. In one particular form, by utilizing a solidification reaction where the presence or absence of non-equilibrium eutectic phases is manipulated during the layer-by-layer buildup of an article that is being made or repaired via AM, hot tearing and other undesirable externalities associated with traditional AM is minimized or outright avoided. As will be discussed in more detail, the disclosed alloys were designed to solidify with up to about 15% of non-equilibrium (soluble) eutectic constituents for improved resistance to hot tearing. The eutectic constituents are then made to be substantially dissolved during post-AM solution treatment to restore a single-phase Mg matrix that is free of these coarse eutectic constituents.

Without being bound by theory, the authors of the present disclosure believe that composition is the main factor in deciding cracking susceptibility for such alloys. Moreover, cladded layers with hypoeutectic structures have a lower cracking susceptibility than those with a eutectic and hypereutectic structure. Because a large amount of dendrites are formed already within a eutectic system well above the solidus (i.e., at high temperature), the alloy possesses a high strength during final solidification of the remaining liquid, resisting contraction stresses. For alloys close to eutectic composition, a large amount of liquid freezes isothermally at the eutectic temperature (i.e., at low temperature) and shrinkage stresses are kept small. A high fraction of eutectic phase in the microstructure and a eutectic phase with sufficient wettability result in a decreasing susceptibility to hot cracking. The eutectic surrounds the entire primary crystalline grains. Furthermore, a sufficient eutectic film between grains eases the movement of the granular system. Thus, if solidification-related contraction and associated stresses arise, any cracks that do develop are healed by backfilling.

Furthermore, mechanical properties may be adversely affected by certain types of eutectic phases in Mg-based alloys. For example, a β-eutectic phase that may form in a cast AZ91 alloy during makes the alloy susceptible to fracture that initiates by cracking the β-eutectic particles, while providing a subsequent dissolution treatment eliminates the brittle β-eutectic phase which in turn can lead to reduced cracking and associated enhancements in ductility. Other activities take place during rapid solidification processes that can make a material more prone to hot tearing. For example, macrosegregation may take place in large components, such as those fabricated in various casting or forging processes. This in turn causes compositional variations over large distances (tens of centimeters), while microsegregation (which is common in AM processes) takes place on the scale of grain boundaries and secondary dendrite arm spacing of alloying elements, thereby leading to non-equilibrium microstructure that causes localized depletion and enrichment of elements. The extent of microsegregation depends on solidification conditions such as local cooling rates, thermal gradients and changes in chemical composition that in turn control the migration of solutes at the solid/liquid interface. Therefore, in order to homogenize the solution, a post-process solution treatment is performed followed by aging for precipitating the required strengthening phases. During this process eutectics are usually dissolved and a more equilibrium microstructure is obtained.

In one form, the Mg alloys may comprise one or more of Zr, aluminum, Mn, and Ca along with incidental elements and impurities. The alloys may further comprise Y, Er and Nd. In certain embodiments, the disclosed alloys incorporate $Mg_{24}R_5$ precipitate phases, where R is Y, Ca or Gd. The alloys may incorporate rare earth additions (such as Y, Er, Nd or Gd) to form a reactive dispersion to getter the high oxygen contents inherent to AM processes in order to reduce Mg oxides into finer, less detrimental oxide structures that in turn encourages improvements in refined flaw size, flammability, toughness and fatigue. In certain embodiments, the disclosed alloys incorporate Mn for iron (Fe) and silicon (Si) gettering. In certain embodiments, the disclosed alloys include trace amounts of Zr for enhancing the rate and magnitude of solid solution grain refinement and age hardening.

In one form, the use of certain supplemental (such as post-processing) steps such as hot isostatic processing (HIP) can be used on a component made from the alloy to achieve cooling-related shrinkage control. While HIP has historically been used only for densification and defect elimination of material (which left any modification and optimization of a material's microstructure to typically be performed after the HIP process in a separate heat-treatment step), it will be understood that it may also be integrated with a heat treatment step in order to eliminate process steps in the post-processing of such component and therefore achieve a more time- and cost-effective post-processing.

As previously mentioned, heat treatment steps may be included for promoting the dissolving of the eutectic constituents in order to restore a substantially single-phase Mg matrix. Such heat treating may be used for other purposes as well, including one or more of porosity reduction, stress relief and component strengthening (such as through precipitation hardening). With specific regard to the porosity reduction, macroscale and microscale internal porosity values may be used as part of a heat treatment model to improve the accuracy of predictions related to distortion, microstructure, dendrites and second phases such as eutectic reinforcement particles and nanoscale precipitates.

In certain embodiments, the alloys may comprise, by weight, about 0% to about 2% Ca, about 0% to about 6% Aluminum, about 0% to about 1% Mn, up to about 1% Zr, and the balance of weight percent comprising Mg and incidental elements and impurities. In certain embodiments, the alloys may further comprise, by weight, 0 to about 8% Y, 0 to about 16% Er, up to about 1% Gd, 0 to about 6% Nd, up to about 1% Gd, 0 up to about 2% Ca and the balance of weight percent comprising Mg and incidental elements and impurities.

In another example implementation, a Mg alloy, which is suitable for AM, includes by weight: 0% to about 6% Nd, 0% to about 1% Zr, 0% to about 8% Y, 0% to about 16% Er, 0% to about 16% Ca, 0% to about 1% Gd, 0% to about 1% Mn, or combinations thereof. Here, the balance is Mg and incidental elements and impurities.

As yet another example implementation, an alloy, which is suitable for AM, includes by weight: 0% to about 6% Nd, 0% to about 1% Zr, 0% to about 8% Y, 0% to about 16% Er, 0% to about 16% Ca, and 0% to about 1% Gd, or combinations thereof. Here, the balance comprises Mg and incidental elements and impurities.

As yet another example implementation, an alloy, which is suitable for AM, includes by weight: 3% to about 6% Nd, 0% to about 1% Zr, 4% to about 8% Y, 0% to about 16% Er, 0% to about 16% Ca, 0.5% to about 1% Gd, or combinations thereof. Here, the balance comprises Mg and incidental elements and impurities.

Incidental elements and impurities in the disclosed alloys may include, but are not limited to, Si, Fe, nickel (Ni), copper (Cu), Dy, lithium (Li), Gd, Mn, samarium (Sm) or mixtures thereof, and may be present in the alloys disclosed herein in amounts totaling no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.05%, no more than 0.01%, or no more than 0.001%. In certain embodiments, the alloys include no more than 0.05% of Fe and Si each, and no more than 0.01% of other incidentals.

It is understood that the alloys described herein may in one form consist only of the above-mentioned constituents or may consist essentially of such constituents, while in another form may include additional constituents.

Series A. Transient Laves Phase Eutectic for Hot Tearing Resistance+$Mg_{24}R_5$-Phase Precipitate Strengthening In certain embodiments, the disclosed alloys are designed to contain a selected percent of soluble Laves phase eutectic for hot tearing resistance and a selected percent $Mg_{24}R_5$-phase precipitated at a selected temperature for high strength. In certain embodiments, the disclosed alloys are designed to contain about 0.8% of soluble Laves phase eutectic for hot tearing resistance and greater than 6% of $Mg_{24}R_5$-Phase precipitated at about 250° C.

In certain embodiments, the alloy comprises, by weight, about 2% Er, about 0.1% Ca, about 5.37% Y, about 3.337% Nd, about 0.603% Zr, 0.477% Gd and the balance of weight percent comprising Mg and incidental elements and impurities. In certain embodiments, the alloy comprises about 2.86% Er, about 0.19% Ca, about 2.86% Y, about 3.22% Nd, about 0.39% Zr, 1.575% Gd and the balance of weight percent comprising Mg and incidental elements and impurities.

In certain embodiments, the disclosed alloys incorporate $Mg_{24}R_5$ precipitate phases, where R is Ca, Y, Er, Gd or Dy. The alloys may incorporate one or more rare earth additions (such as Y, Er, Gd or Dy) to form a reactive dispersion to getter the high oxygen contents inherent to AM processes, for refined flaw size and improved toughness and fatigue. As will be understood, DED allows some element tailoring for alloy development purposes. As such, it is possible to advantageously include or eliminate elements during processing, depending on the need. It will be further understood that within the particular context of the Mg24R5 precipitate phases, certain elements such as Zr, Mn, Ca and others will not be present, while in other precipitate phases they may be. Likewise, in certain embodiments, the disclosed alloys incorporate Mn for Fe and Si gettering. In certain embodiments, the disclosed alloys include Ca and Er for enhancing the flammability, rate and magnitude of Laves phase age hardening. The inclusion of Zr may result in Zr particles with grain interiors, which contribute to grain refinement.

Series B. Transient Laves-Phase Eutectic for Hot Tearing Resistance+$Mg_{24}R_5$-Phase Precipitate Strengthening In certain embodiments, the disclosed alloys are designed to contain a selected percent of soluble Laves phase eutectic for hot tearing resistance and a selected percent Laves phase precipitated at a selected temperature for high strength. In certain embodiments, the disclosed alloys are designed to contain about 10% of soluble Laves-phase eutectic for hot tearing resistance, and greater than 6% T-phase, precipitated at about 250° C.

In certain embodiments, the alloy comprises, by weight, about 5% Er, about 0.383% Ca, about 4.317% Y, about 2.682% Nd, about 0.485% Zr, 1.575% Gd and the balance of weight percent comprising Mg and incidental elements and impurities. In certain embodiments, the alloy comprises, by weight, about 4.57% Er, about 0.065% Ca, about 2.3% Y, about 2.587% Nd, about 0.313% Zr, 1.264% Gd and the balance of weight percent comprising Mg and incidental elements and impurities.

In certain embodiments, the disclosed alloys incorporate $Mg_{24}R_5$ precipitate phases, where R is Ca, Y, Er, Gd or Dy. The alloys may incorporate rare earth additions such as those discussed previously in order to form a reactive dispersion to getter the high oxygen contents inherent to AM processes, for refined flaw size and improved toughness and fatigue. In certain embodiments, the disclosed alloys incorporate Mn for iron and silicon gettering. In certain embodiments, the disclosed alloys include Ca and Er for enhancing the flammability, rate and magnitude of Laves phase age hardening. Zr particles are observed in grain interiors, which contribute to grain refinement.

As will be appreciated by comparing the aforementioned Series A and Series B variants, each series have different amounts of rare earth elements, and that these, as well as other elements that have been included, result in different microstructure, phase transformations and mechanical properties.

Series C. β' and β"-Phase Precipitate Strengthening

In certain embodiments, the disclosed alloys are designed to contain above 4% phase, precipitated at a selected temperature for high strength. The solvus temperature of equilibrium β' and β" phase may be less than a selected temperature. The solidification temperature range may be restricted to a maximum temperature. In certain embodiments, the disclosed alloys contain up to or above 1% β' and β"-phase, precipitated at about 200° C., for high strength. The solvus temperature of equilibrium β' and β"-phase may be less than about 400° C. The solidification temperature range may be a maximum of 170° C.

In certain embodiments, the alloys may comprise, by weight, about 4% to about 9% zinc, about 0.5% to about 3% Mg, up to about 0.5% Cu, up to about 1% Zr and the balance of weight percent comprising Mg and incidental elements and impurities.

In certain embodiments, the disclosed alloys incorporate β' and β"-phase precipitate phases, where β' is $Mg_{12}$ (Y, Nd or Er) and Mg3 (Y, Nd, Er or Gd), respectively. The alloys may incorporate one or more of the aforementioned rare earth additions. In certain embodiments, the disclosed alloys incorporate Mn for iron and silicon gettering. In certain embodiments, the disclosed alloys include Ca and Er for enhancing the flammability, rate and magnitude of Laves phase age hardening. Zr particles are observed in grain interiors, which—as previously noted—contribute to grain refinement.

Methods of Manufacturing Mg Alloys

The disclosed Mg alloys can be fabricated into various input stock forms relevant to the AM system of interest. One example relevant to powder-bed fusion or DED systems includes incorporating primary elements into a homogeneous melt and fabrication into powder form using available atomization techniques such as inert gas atomization. The alloys can also be fabricated into wire form via conventional ingot metallurgy and wire drawing techniques for use in wire-based AM systems.

Referring first to FIG. 1, a process according to the present disclosure is shown used to manufacture a component. An apparatus 100 includes an energy source (such as a laser) 110 to generate a concentrated energy beam 120 that may be redirected through a mirror 125 and associated beam control mechanisms such as a lens-based beam scanner (not shown). The feedstock material 130 to be melted may be stored in one or more hoppers 140 that is delivered through feed lines 150 such that in the case of multiple ingredients may be either combined upstream (as shown) or mixed upon delivery into a vessel 160 for either gravity or forced introduction onto a substrate 170. Although notionally shown as having two hoppers 140, it will be appreciated that there could be more, depending on the number of ingredients needed for the feedstock material 130.

Management of one or more operations depicted in FIG. 1 may be accomplished through be computer-based controller 190. In one form, the controller 190 is configured as a general-purpose computing device that may include—among other things—one or more processors or processing units 190A, computer-readable media in the form of memory 190B, and input/output (I/O) 190C, all signally coupled via bus 190D.

In one form, the processor 190A may be in the form of a general-purpose processor such as a central processing unit (CPU), an application specific integrated circuit (ASIC), a field programmable gate array (FPGA), a digital signal processor (DSP), a microprocessor unit (MPU), a graphics processing unit (GPU), system-on-a-chip (SoC) or other programmable logic device, discrete gate or transistor logic, discrete hardware components or any combination thereof designed to perform the operations described herein. Likewise, the processor 190A may include modules to perform various arithmetic, control logic and related processing functions.

In one form, the memory 190B that is accessible to the processor 190A and may be adapted to store various programs that will be discussed in more details as follows. In one form, memory 190B is in readable or writable form may include both volatile media (such as random access memory, RAM, cache or the like, in one form for the storage of data) and non-volatile media (such as read-only memory, ROM, often in the form of flash, hard disks, optical disks such as compact disks (CDs), digital video disks (DVDs) or the like, in one form for the storage of programs for various algorithmic control logic-based operations), as well in removable and non-removable media configurations. Memory 190B may be connected to the bus 190D by one or more data media interfaces. In one form, I/O 190C input is configured as a keyboard, mouse, verbal command, joystick or other known means, while output may be in the form of video display, audio message or other known means. In addition, the I/O 190C may be configured to have wired or wireless connectivity through known communication protocols. Although the bus 190D is shown as a wired connection, it will be appreciated that it may be configured to have at least some of its functionality embodied in a wireless format (including the transmitting or receiving of radio-frequency signals via antenna, and that all such variants are deemed to be within the scope of the present disclosure.

One or more programs 190E to carry out one or more operations or methodologies as discussed herein may be stored in memory 190B. By way of example, and not limitation, such programs 190E may include an operating system, one or more application programs, program data or the like, as well as programs for network connectivity such as through a suitable communication protocol including local area network (LAN) or wide area network) WAN, as well as a public network (such as the internet), a WiFi network or the like, along with a suitable network adapter or other bus-enabled interface. In one form, such connectivity may be through a distributed, remote environment such as a server-client network environment, peer-to-peer environment, through the cloud or the like (none of which are shown). In such a distributed configuration, various modules making up one or more parts of the program or programs 190E may be located in both local and remote computer system storage media, including those discussed herein. In one form, the program or programs 190E may be in modular format such that each module generally carries out one or more discrete functions or tasks of the functions or methodologies of embodiments of the apparatus 100 as described herein. These modules may include—among other things— various instruction sets, logic, programs, routines, objects, components, data structures or the like in order to perform particular tasks or implement particular abstract data types. It is understood that by programming or otherwise loading the programs 190E and related executable instructions onto the controller 190, at least one of the processor 190A and memory 190B are changed. This in turn transforms at least a part of the controller 190 into a particular machine or apparatus having the novel functionality for managing the operation of the one or more AM systems and processes disclosed herein.

In one form, creating an article 180 from an Mg alloy further includes providing a three-dimensional design (such as through controller 190), and subjecting the powdered alloy composition of the feedstock material 130 to an AM procedure that employs a laser beam. Using AM processes with the disclosed alloys, the desired alloy microstructure and properties can be generated directly in a component-shaped version of the article 180. Depending on the type of AM being used, various additional equipment (not shown) may be used to help to spread or otherwise distribute the deposited material on the substrate 170; such additional equipment may be computer operated through the controller 190 and include a coater (or recoater) arm or rake that may travel over the substrate 170 to remove excess material through vacuuming, blowing, scraping or the like that in turn may be sent to a material recycle or waste container. In additional to the mirror 125 and lens-based beam scanner, other beam control mechanisms may be made responsive to a computer-controlled scan pattern (also managed by controller 190) in order to achieve precise deposition and placement of the feedstock material 130. Height control equipment may be used to selectively raise and lower the platform upon which the substrate is placed. Thus, the platform may be lowered to allow another layer of feedstock material 130 to be deposited and then melted or sintered. Also, post-fabrication equipment may include (in addition to the aforementioned heat treatment being used for dissolving the one or more non-equilibrium eutectic constituents that developed during solidification) a stress relief heat treatment process. Additionally, thermal and chemical post-processing procedures may additionally be used to finish a fabricated article 180 that—although shown notionally as having a generally planar shape in the figure—will be understood to represent a variety of articles, such as structural components in general, as well as vehicular and aerospace structural components in particular, such as a helicopter gearbox housing.

The DED process of FIG. 1 differs from DLMS, SLS or SLM largely in the mode used to build each individual layer of the deposited feedstock material 130 in what is known as a layer-by-layer mode of forming. For example, during DED a layer is constructed by point-to-point deposition such that powders are first directed towards a specific position and then followed by melting the powders and subsequent rapid solidification. In one form, the melting under DED is achieved through laser heating (such as through the concentrated energy beam 120) to create a melt pool in the substrate 170 and deposited layers while either powder or wire versions of feedstock material 130 is fed into the melt pool. As shown, in powder-based DED AM, multiple powder hoppers 140 each filled with different feedstock material 130 can be used. Furthermore, the relative fractions of these powders delivered to the melt pool can be varied, such as by a few volume percent per layer. By virtue of its ability to impart incremental changes as well as tailor the chemistry of the component as a function of position, DED is well-suited for fabricating new alloys and complex functionally graded materials (FGMs). Similarly, gradual changes in compositions or constituents are enabled by changing the ingredient powders during the deposition process. Likewise, by the present direct feeding approach, the different feedstock materials 130 that are stored in the multiple powder hoppers 140 can be combined in situ during DED.

In contrast, during SLM or SLS, a layer of the feedstock material 130 in powder form is deposited on the substrate 170 with thickness on the order of tens to thousands of micrometers, after which the concentrated energy beam 120 in the form of a laser beam (similar to energy source 110) selectively scans the layer of powders per a pre-determined path, causing melting and sintering of the deposited powders as they are scanned. By using SLM, in situ alloy development and FGMs with a change in composition or constituent feedstock material 130 along the direction perpendicular to the layers can be readily manufactured. In particular, SLM provides high precision and small feature in order to produce lightweight structures based on lattices, which are particularly appealing features for complex structures with internal passages such as turbine blades that may be more difficult to achieve with DED subsets such as laser metal deposition (LMD). Unlike DED, the melt pool size is smaller, often about 0.05 to 0.15 mm.

Due to the high thermal conductivity of Mg-based alloys, the cooling rates that take place for each of the DED, SLM and SLS processes are extremely rapid. For example, DED cooling rates are about $10^3$ to $10^5$ C/s, while those for Mg-based alloys are closer to $10^4$ C/s. Likewise, the cooling rates in an SLS and SLM processes are typically between $10^5$ to $10^{8 \circ}$ C./s in general and for Mg-based alloys, between $4.3 \times 10^6$ and $7.3 \times 10^{6 \circ}$ C./s. Much of these cooling rates are. Given these very high cooling rates, the melted (that is to say, the fused) layer of the deposited feedstock material 130 that has been subjected to the concentrated energy beam 120 under DED will entirely solidify by the time the next layer is deposited; such solidification includes that of the non-equilibrium eutectic solidification stages. In one form, the melt pool size during DED is about 2 to 3 mm. Upon formation of a subsequent layer, the previously-deposited layer will exhibit a residual heat of between 100° C. and 400° C. on the substrate; because the temperature of this area surrounding the melt pool is lower than the melting point of Mg and the last solidifying eutectic phase, the melt pool typically will remelt the previous layer, thereby promoting metallurgical bonding with the previous layer.

Referring next to FIGS. 2A through 2D, compared to the known alloy WE43, some of the alloys developed in accordance with the present disclosure show signification reduction in hot tearing, as measured by a strain cracking index (SCI, also referred to as solidification cracking susceptibility (SCS)). Within the present disclosure, a select number of the newly-developed alloys that are disclosed herein are referred to in a shorthand manner, such as Alloy 1, Alloy 2, Alloy 3, Alloy 5 or Alloy 9.

The alloys and methods disclosed herein promote improved hot-tearing resistance of a layer-by-layer generated component or related article that is not achievable in either conventional wrought or casting processes. To optimize the alloys disclosed herein for AM, the authors of the present disclosure have identified ways to reduce the likelihood of solidification cracking that can arise due to—among other things—the rapid cooling and associated solidification rate. In particular, the rapid solidification that is associated with certain forms of AM interferes with the normal cooling-related shrinkage and thermal contraction of a heated material in a semi-solid state by not providing adequate amounts of material that is still in its liquid state to the grain boundaries. When the liquid becomes trapped between dendrite arms, it causes stress resulting from the lower density of the liquid when compared to the solid. This in turn results in significant increases in residual stresses that render these alloys highly susceptible to hot tearing, solidification cracking, hot cracking and related shrinkage-related solidification dynamics. The SCS or SCI is related to the ability of the liquid to move out of the area between dendrite arms when shrinkage occurs.

Figure 2A:
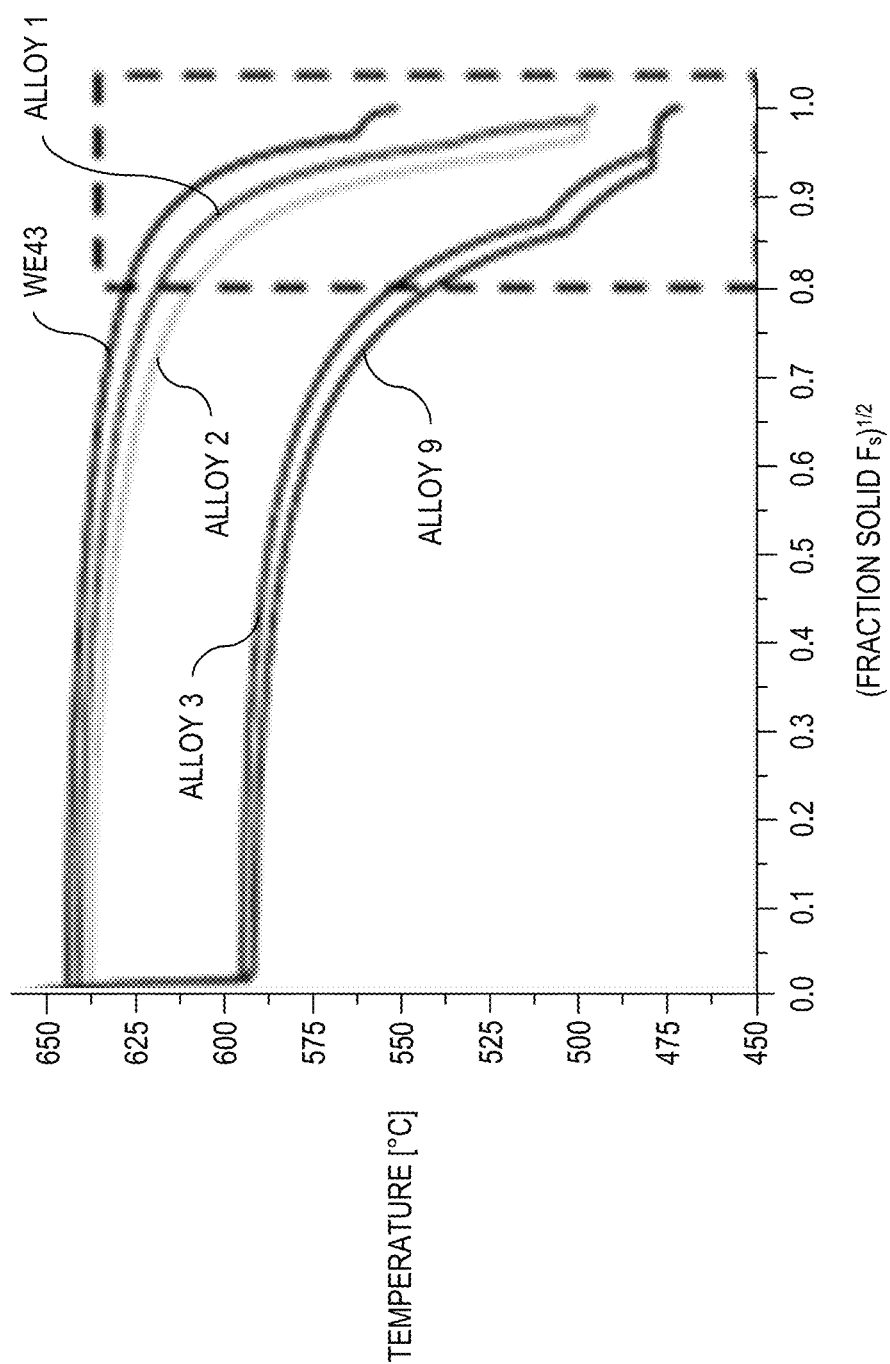
FIGS. 2A through 2D depict changes to a hot tearing figure of merit for some of the Mg-based alloys disclosed herein relative to a legacy alloy.

Referring with particularity to FIG. 2A, the ability of the liquid to escape the region between dendrite arms is referred to as liquid feeding ability and is related to the slope of the temperature versus the square root of the solid fraction as defined by the Kou SCS model. The temperature versus the square root of the solid fraction is obtained using the Scheil-Gulliver solidification model and used to calculate the SCS.

$$SCS = \max\left|\frac{dT}{d(f_s^{1/2})}\right|$$

Where $f_s$ and T are the total solid fraction and temperature, respectively.

Thus, increasing $$\left|\frac{dT}{d(f_s^{1/2})}\right|$$

near $f_s^{1/2}=1$ increases the crack susceptibility by decreasing the growth rate dR/dt (growth rate of grains) that is needed for the grains to bond together to resist cracking. It also increases the length of the liquid channel along the grain boundary. A longer grain boundary channel hinders the liquid feeding that is needed to fill the grain boundary to resist cracking. In fact, from a mechanics point of view, a longer grain boundary channel is also easier to open up and propagate under tension.

Figure 2B:
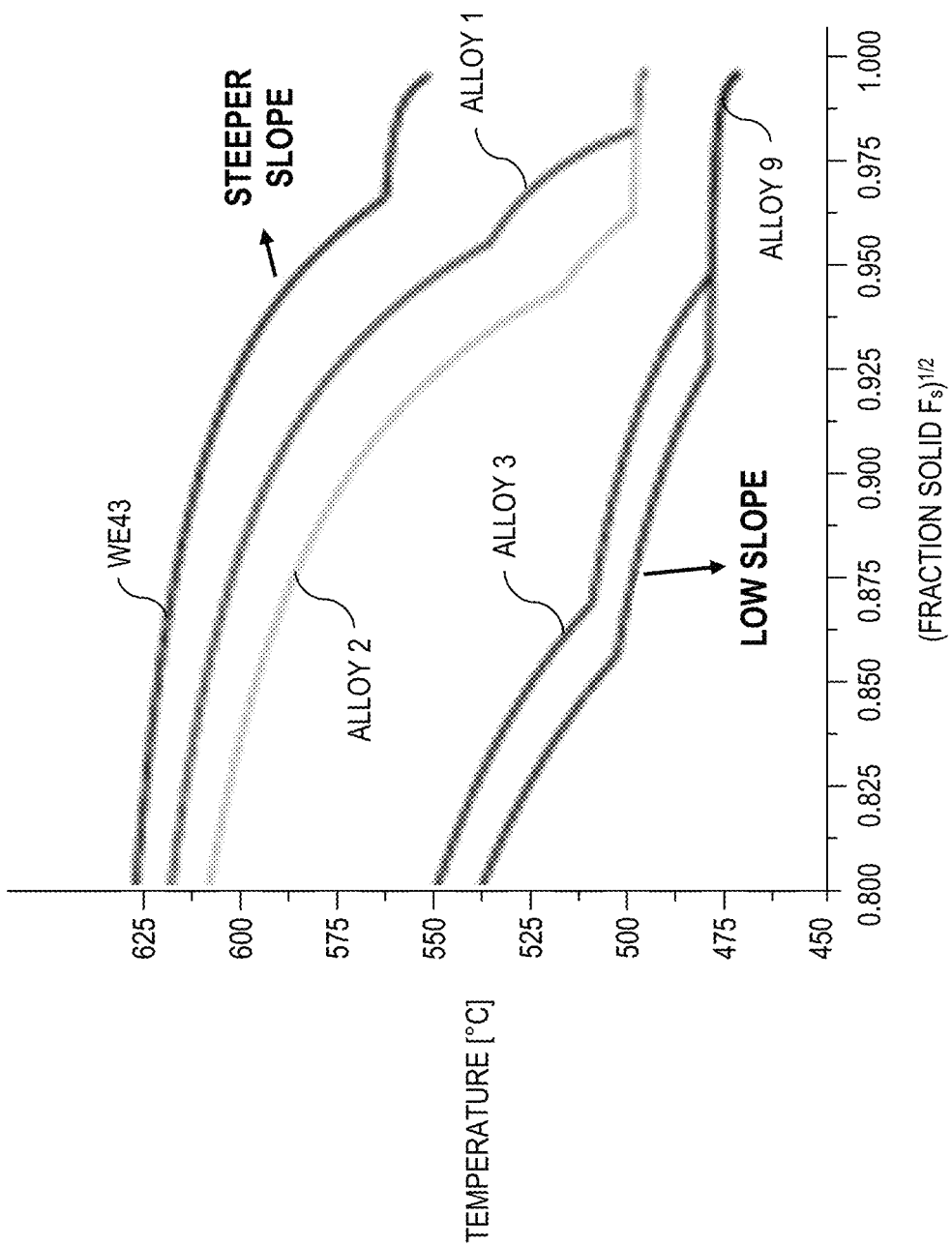

Referring with particularity to FIG. 2B, a more detailed view of the region of interest from FIG. 2A is shown. In it, the quantity $$\left|\frac{dt}{d(f_s^{1/2})}\right|$$

near $f_s^{1/2}=1$ can be used as an index for the SCS, that is, the steeper the slope of the $T-f_s^{1/2}$ curve near $f_s^{1/2}=1$ is, the greater the crack susceptibility. In one form, the susceptibility of a certain Mg-based alloy to hot tear cracking may be formed into an index as a straightforward way to compare the alloys against legacy alloys. In one form, the controller 190 may be configured to algorithmically predict the SCS by one or more of the aforementioned models. It will be appreciated that the foregoing analysis can be used to predict the SCS or SCI of any of the Alloy 1, Alloy 2, Alloy 3, Alloy 5 or Alloy 9 materials disclosed herein.

Figure 2C:
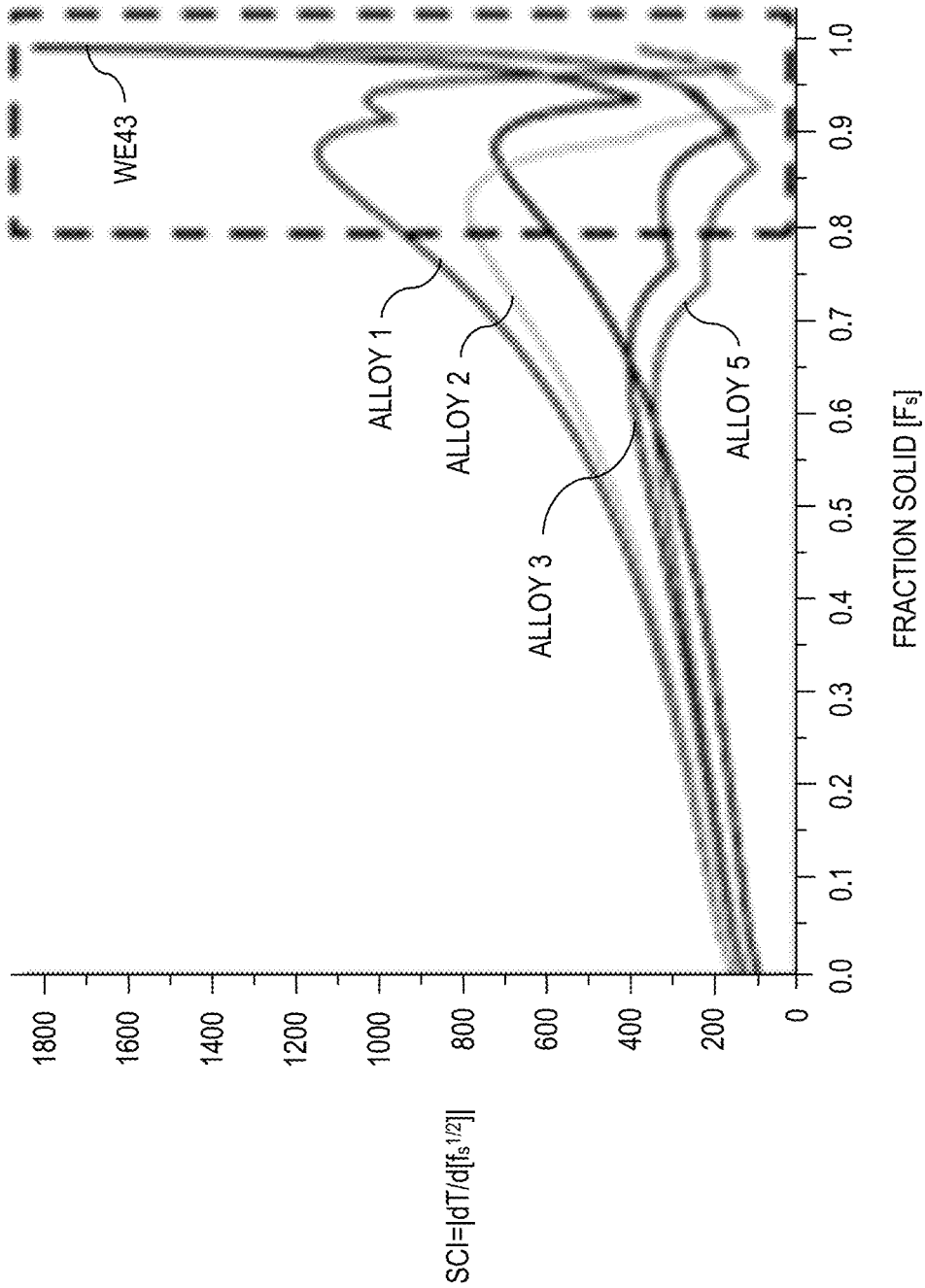
Figure 2D:
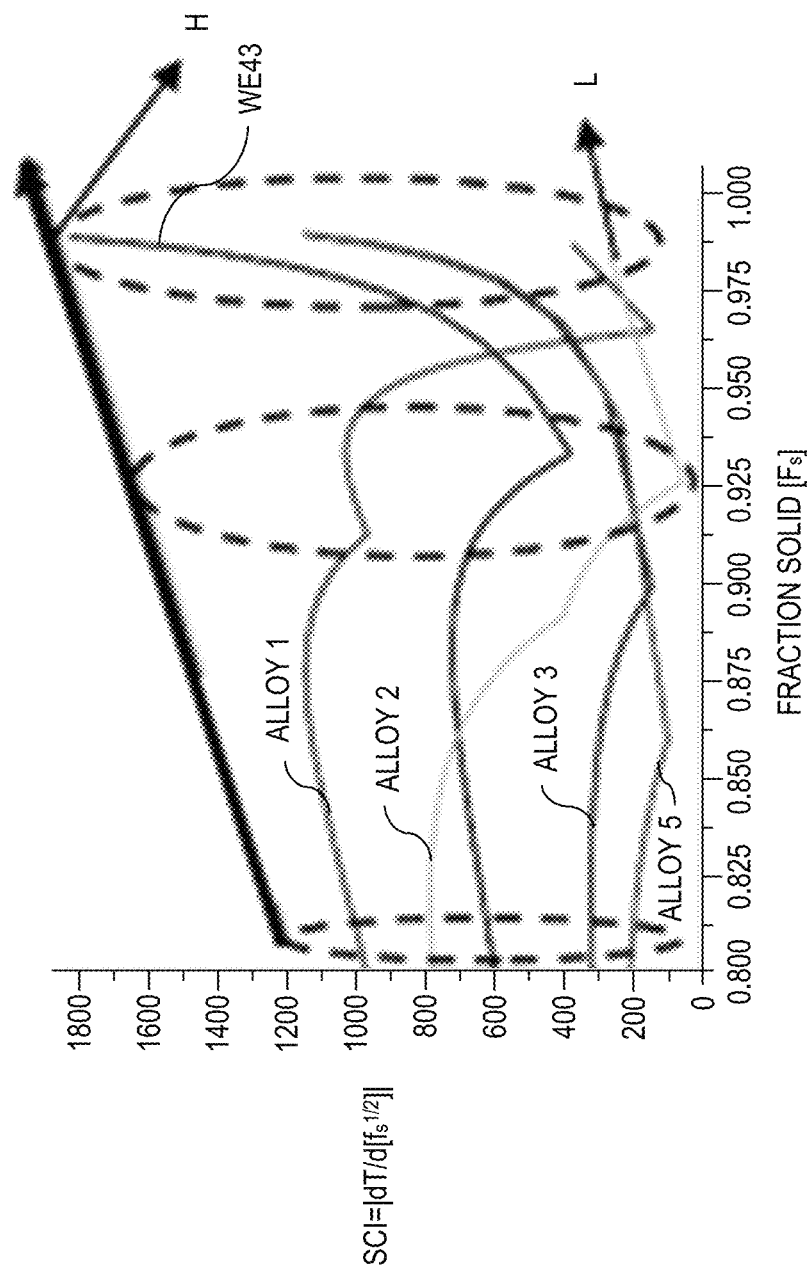

Referring with particularity to FIGS. 2C, and 2D, the relationship between SCI and total solid fraction is shown for the various alloys. The region of interest of FIG. 2C is shown in greater detail in FIG. 2D where the larger SCI numbers correspond to a high susceptibility to hot tearing H while the smaller SCI numbers correspond to a low susceptibility to hot tearing L.

Figure 3:
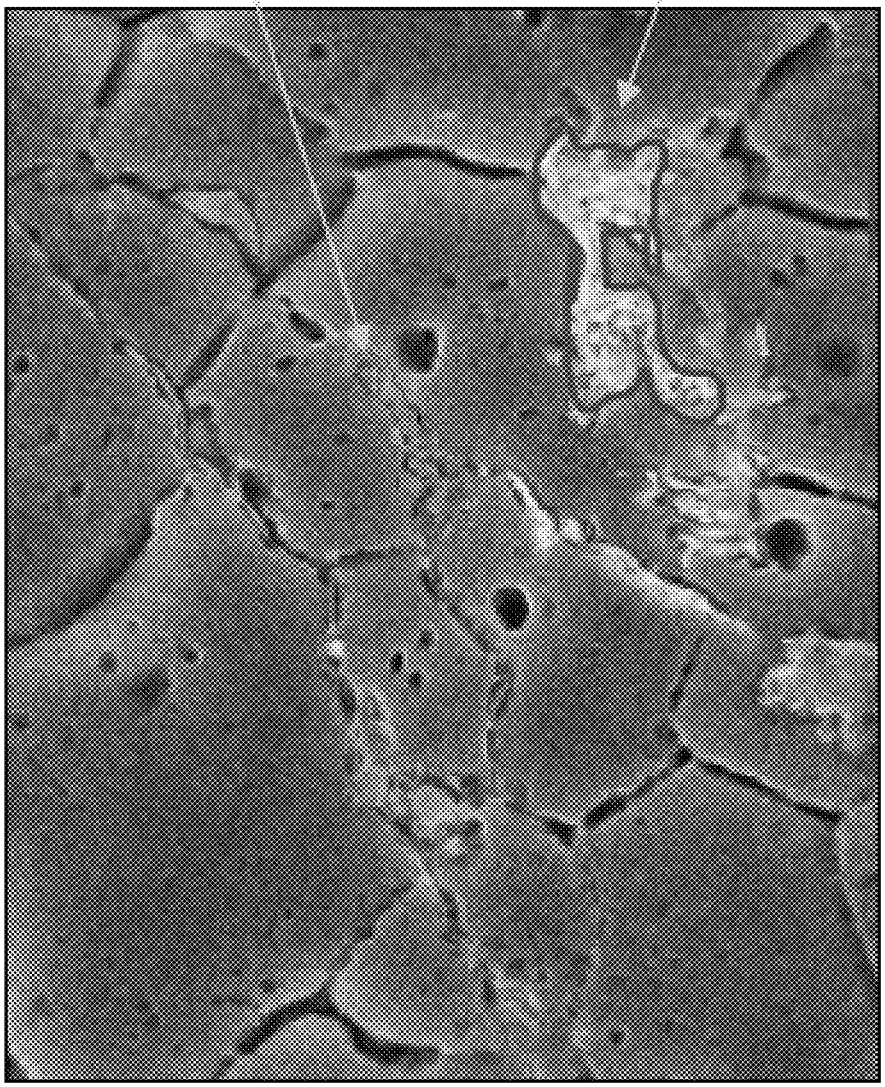
FIG. 3 depicts an energy-dispersive X-ray spectroscopy (EDS) mapping of one of the Mg-based alloys disclosed herein in its as-deposited state.

Referring next to FIG. 3, the microstructure influence on improved properties is shown for one of the Mg-based alloys developed herein. In this case, the as-deposited alloy (referred to herein as Alloy 1) is shown as an EDS mapping, including various bright phases segregated at grain boundary. Elemental charts shown to the right of each mapping indicate the corresponding percentages of various elements within the highlighted regions. Thus, the superimposed lines around the eutectic regions indicate the elemental distribution of the selected area to show how phases have formed post-solidification, while also showing with particularity the respective compositions of those individual phases. Significantly, grain size, grain morphology (equiaxed), distribution of intermetallic and eutectic phases in the inter and intragrain or cell boundaries are factors that may be relied upon, as are the elemental composition of the phases formed. This data can be used for several predictions, such as phase field modeling, advancing the aforementioned CALPHAD databases, strength predictions or the like.

The EDS investigation reveals the presence of Y, Ca and Er elements at the grain boundary regions which are forming these phases. Also, the EDS confirms the presence of Y, Nd and Er to influence the process of grain refinement and formation of the strengthening precipitate phase such as $Mg_{41}(Nd, Er)_5$ and $Mg_{24}(Y, Er)_5$. EDS also reveals the formation of nano-size Zr-rich precipitates forming close to the grain boundary. The coarser flakes also contained Zr along with the main rare earths Nd, Er and Y, while the finer oxygen-rich flakes exhibiting the highest aspect ratio among all the secondary phases in the microstructure contained only Zr and Y, with no sign of Er or Ca.

Figure 4:
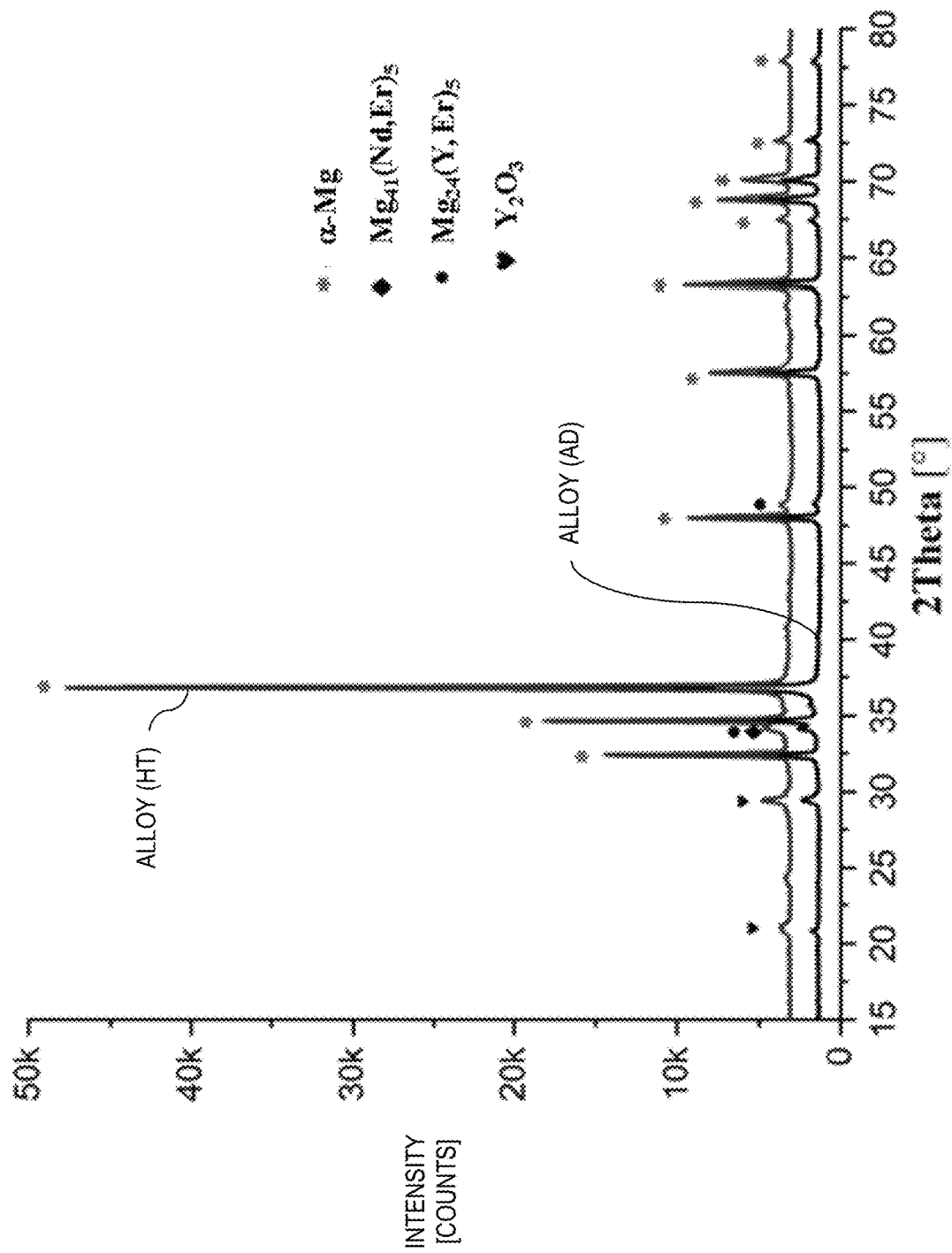
FIG. 4 depicts an X-ray diffraction (XRD) pattern of the alloy of FIG. 3 in its as-deposited and heat-treated conditions.

Referring next to FIG. 4, an XRD pattern of Alloy 1 in as-deposited and heat-treated conditions is shown. As with the EDS of FIG. 3, the XRD techniques shown here confirm the presence of Y, Nd and Er to influence the process of grain refinement and formation of the strengthening precipitate phase such as $Mg_{41}(Nd, Er)_5$ and $Mg_{24}(Y, Er)_5$. In related XRD patterns (not shown) the formation of yttrium oxide ($Y_2O_3$) is confirmed, where the intensity increased gradually in the heat-treated condition.

Figure 5:
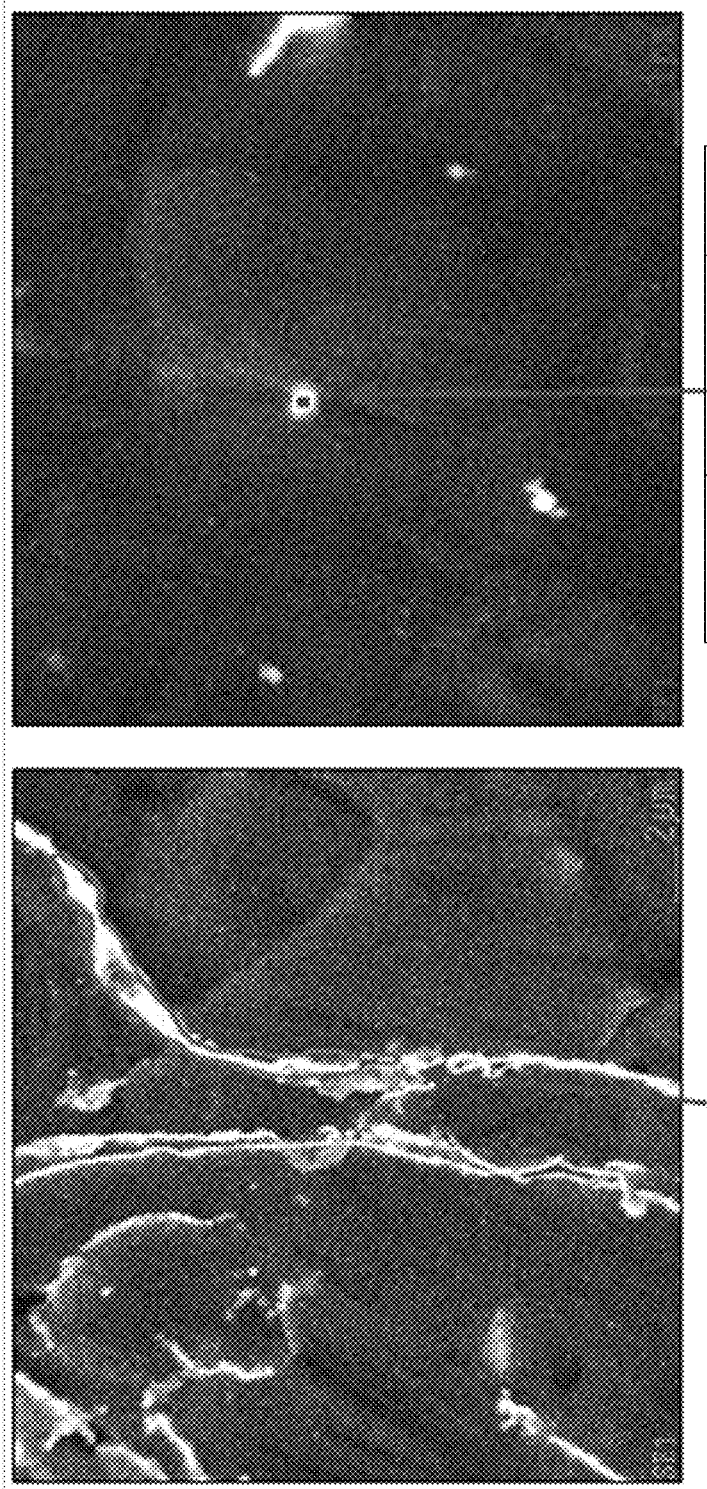
FIG. 5 depicts EDS results of an as-deposited sample.
Figure 6:
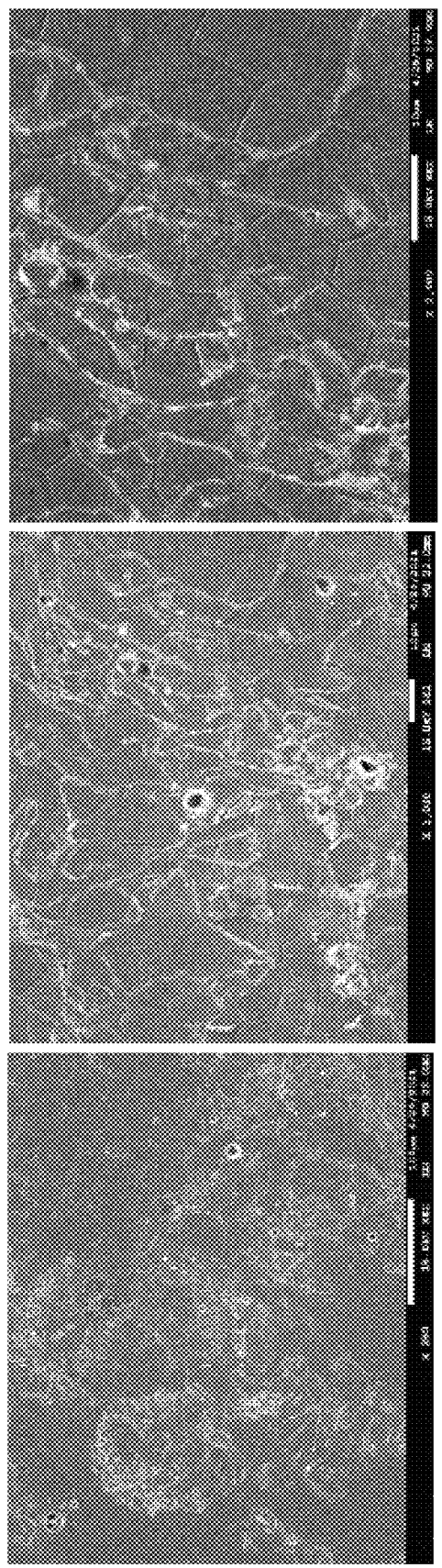
FIG. 6 depicts EDS results of a heat-treated sample.

Referring next to FIGS. 5 and 6, EDS mapping was used to investigate the elements present in the microstructure of an as-deposited and heat-treated sample, respectively. Referring with particularity to FIG. 5, the mapping revealed the segregation of Y at the grain boundary regions of this microstructure, forming this bright continuous phase. EDS results show that the grain boundary regions are rich with Y, Nd and bright nanoscale precipitates are rich with Zr for Alloy 5. This mapping also shows that Nd is distributed into the Mg matrix uniformly, while the presence of nano precipitates rich with Zr at dendrite and grain boundaries is also in evidence. As with FIG. 3, elemental charts shown to the right of each mapping indicate the corresponding percentages of various elements within the highlighted regions. Referring with particularity to FIG. 6, the mapping revealed an increase in grain size compared to the as-deposited microstructure. Bright Y-rich phases are present in the grain boundary regions, even after heat treatment.

Testing performed on a coupon samples of some of the Mg-based alloys in their as-deposited condition and that were developed in accordance with the present disclosure relative to legacy alloys (such as variants of the WE43 alloy) revealed improved uniaxial tensile and compression properties. These results are shown in numeric form in Table 1. Improved mechanical properties in Alloy 1, Alloy 5 and Alloy 9 due to the addition of Er, Y, Nd, and Ca is observed for each of yield strength (YS), ultimate tensile strengths (UTS) and elongation during DED compared to WE43. This can be attributed to the grain refinement and formation of strengthening precipitates such as $Mg_{41}(Nd, Er)_5$ and $Mg_{24}(Y, Er)_5$ and nano-scaled Zr.

TABLE 1

| As-Deposited Alloys | Yield Strength (MPa) | Ultimate Tensile Strength (MPa) | Elongation (%) |
|---|---|---|---|
| Alloy 1 | 128.7 | 192.6 | 7.89 |
| Alloy 2 | 120.5 | 204.6 | 9.75 |
| Alloy 3 | 111.4 | 166.4 | 5.32 |
| Alloy 4 | 106.7 | 157.5 | 4.99 |

Figure 7:
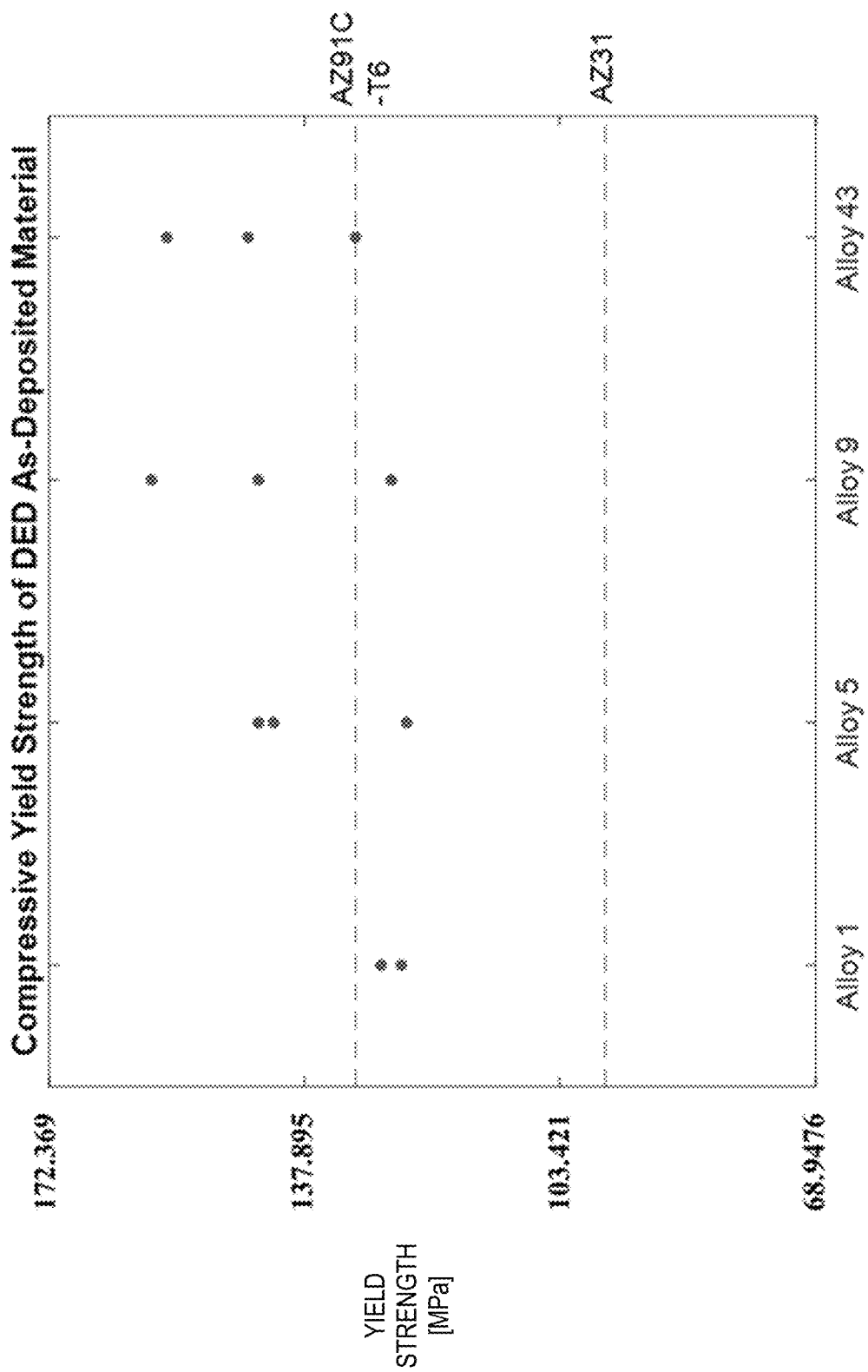
FIG. 7 depicts improved compressive yield strength of some of the Mg-based alloys of the present disclosure in a DED-based as-deposited condition compared to a couple of legacy alloys after a T6 heat-treatment.

Referring next to FIG. 7, improved compressive yield strength of some of the present Mg-based alloys in the as-deposited condition are shown relative to legacy alloys such as AZ31 and AZ91C after a T6 heat-treatment. As can be seen, the compression and tensile results reveal that the AM fabricated Mg alloys that are disclosed herein have better room temperature tensile and compressive strengths than legacy alloys such as AZ31 and AZ91C.

In one form, the authors of the present disclosure believe that with the proper alloy and AM process, components may be manufactured that exhibit properties that are significantly better than existing Mg alloys; in one non-limiting example, YS of greater than 285 MPa is believed to be attainable, as are UTS of greater than 405 MPa along with elongation (EL) of greater than 8% at alloy densities of less than 2.3 g/cc. Moreover, flammability and corrosion resistance is expected by be enhanced relative to legacy alloys and conventional manufacturing processes.

Figure 8:
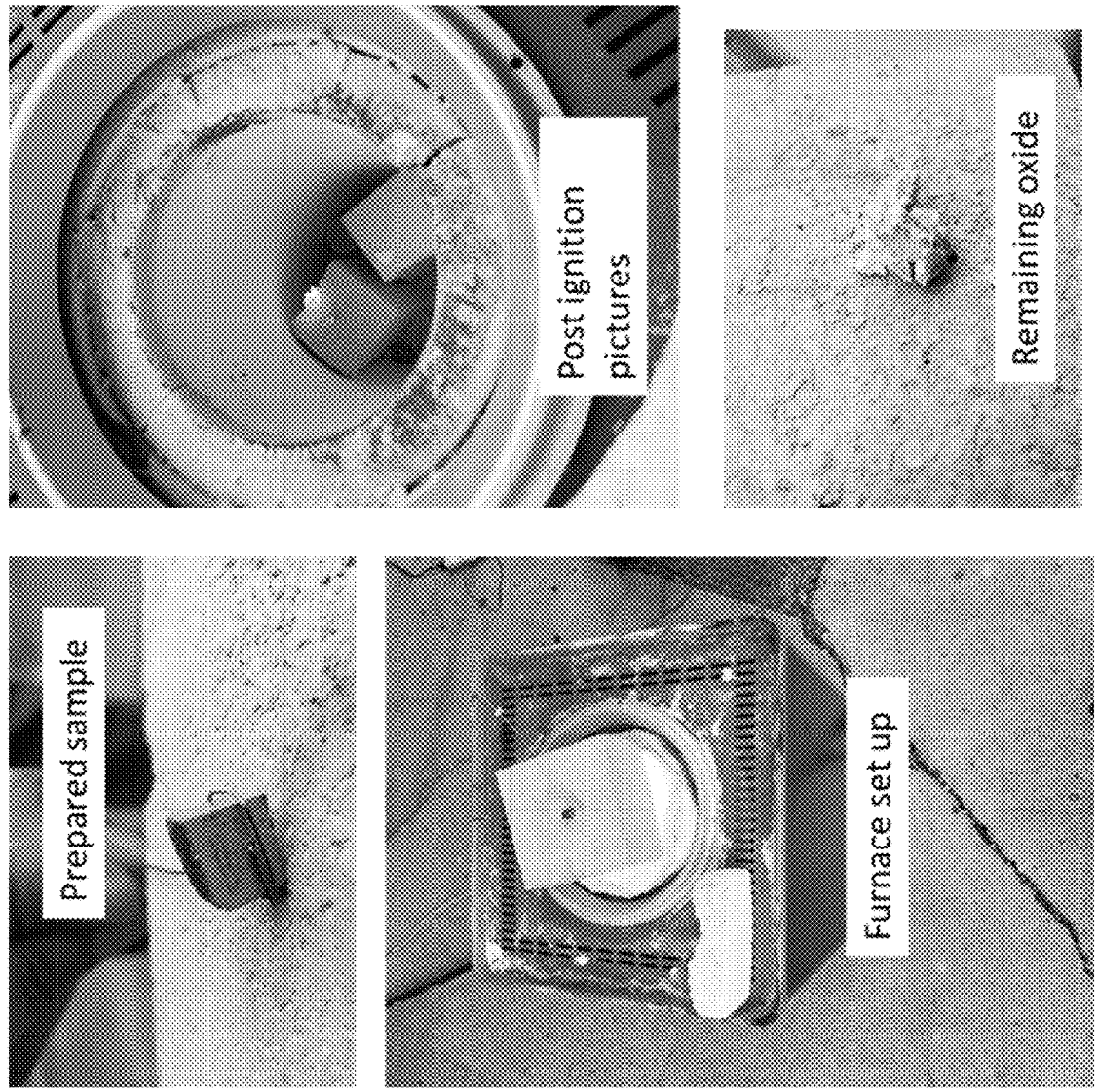
FIG. 8 depicts an experimental setup for testing flammability of the various Mg-based alloys discussed herein.

Referring next to FIG. 8, an experimental setup of for measuring the flammability of Mg-based alloys. First a sample of one of the Mg-based alloys is formed, after which it is placed in a furnace, ignited and then analyzed to determine how much metal oxide remains. In one form, the experimental procedure as shown includes the use of a thermocouple attached to the core of the sample to ensure an uninterrupted contact and an accurate measurement of the temperature evolution.

Figure 9C:
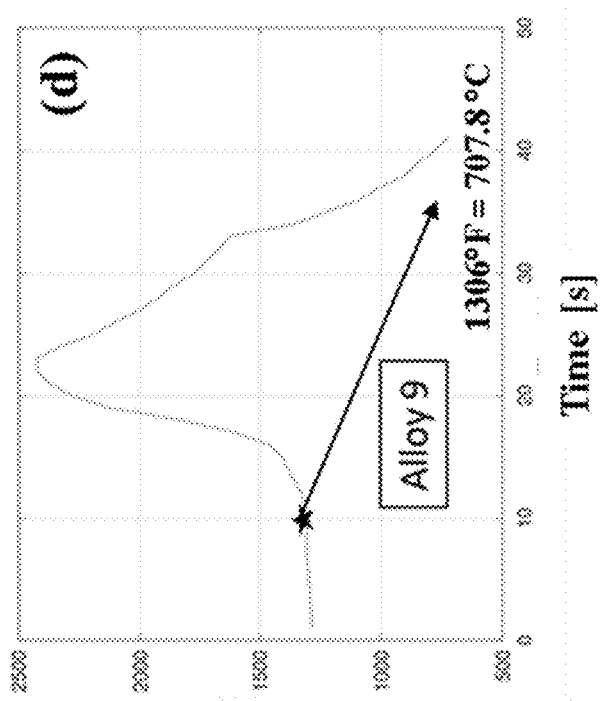
Figure 9D:
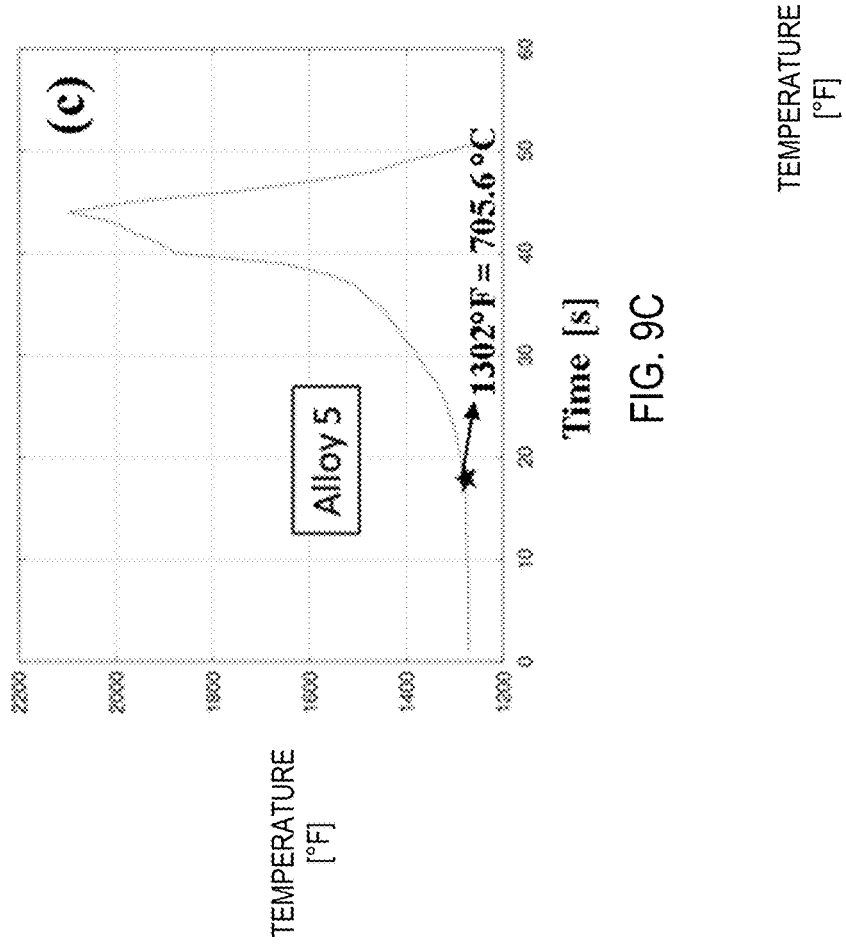

Referring next to FIGS. 9A through 9D, thermocouple data from the flammability experiments show an abbreviated time duration to focus on the region where the ignition occurs. Referring with particularity to FIG. 9A, literature data on the ignition temperature of various legacy alloys disregards the time to ignition. Referring with particularity to FIGS. 9B through 9D, in the Mg-based alloys of the present disclosure, the temperature vs time curves represented in the plot extend from temperatures of approximately 1200° F. (649° C.) and higher. Each of these alloys (Alloy 1, Alloy 5 and Alloy 9) show higher ignition temperature of compared to the legacy alloys. The portion of each of FIGS. 9B, 9C and 9D are marked with a star to indicate the measured ignition point.

Figure 10:
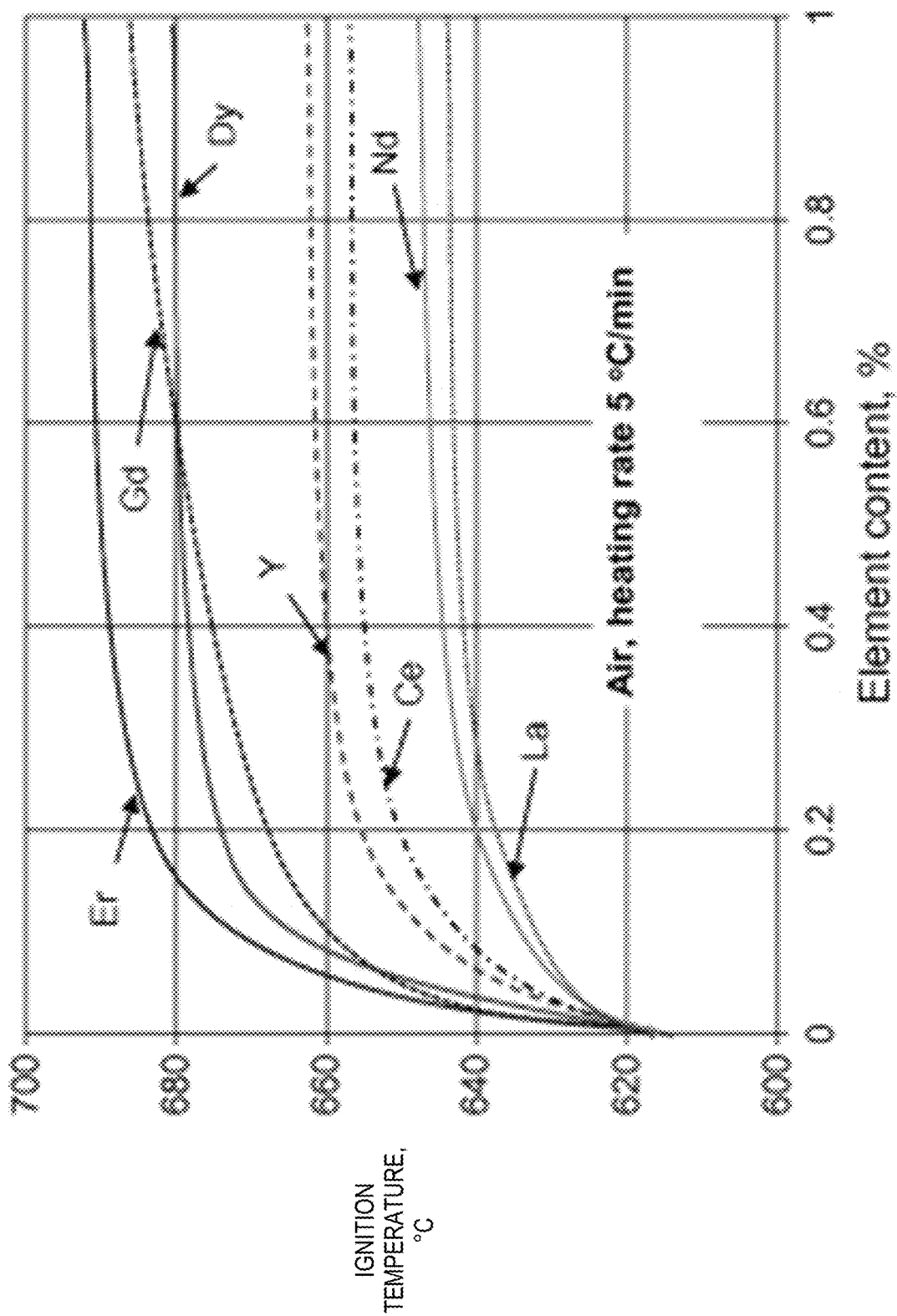
FIG. 10 depicts the effect of rare earth elements on ignition temperature of an Mg alloy.

Referring next to FIG. 10 in conjunction with the experimental setup of FIG. 8, it can be seen that the addition of varying weight percent of rare earth elements increases the ignition temperature of some of the Mg-based alloys disclosed herein. Accurately predicting flammability properties of DED-deposited Mg alloys for the controlled production of Mg is a valuable way to determine if a given Mg-based alloy can be reasonably implemented into a production-based process. Likewise, the use of certain additives can help to achieve this objective through improvements in such flammability properties. As can be seen, after introducing a minor amount of these elements such as Er and Y, there is a significant increase in the ignition temperature. Moreover, there may be an optimum content required to generate the maximum increase in ignition temperature after which the Mg ignition temperature begins to reduce. Believing that the optimum effective amount of rare earth depends on the particular reactive element and the base alloy chemistry, the authors of the present disclosure note that for rare earth additions below an optimum level, if such optimum level exists, a reduction in the melting temperature is accompanied by an increase in the ignition temperature. Significantly, this is in contrast to observations for major alloying elements.

Although not shown in FIG. 10, the use of the non-rare earth Ca is seen as promising, due in part to its general availability and low cost along with the results that show that Ca is very effective in raising the ignition temperature of Mg alloys. For example, additions of 0.27-5.22 wt % Ca increased the ignition temperature of AZ91 alloy to 650° C., which is well with the temperature required to put it into the liquid state. Although not shown, the authors of the present disclosure have found that for Ca amounts of up to 5 wt %, the ignition temperature reached over 900° C., while significant growths were observed for even small amounts starting at around 0.5 wt % Ca. An alternative form of alloying with Ca may be performed via oxide dispersion CaO. This form is seen as viable particularly in view of its low cost, even compared to other forms of Ca. After an addition of 0.42 wt % CaO to the AZ31 alloy, the ignition temperature increased to roughly 615° C., while increases in ignition temperature of the AZ91 D alloy by 200° C. was achieved for contents of 5 wt % of Ca.

Figure 11:
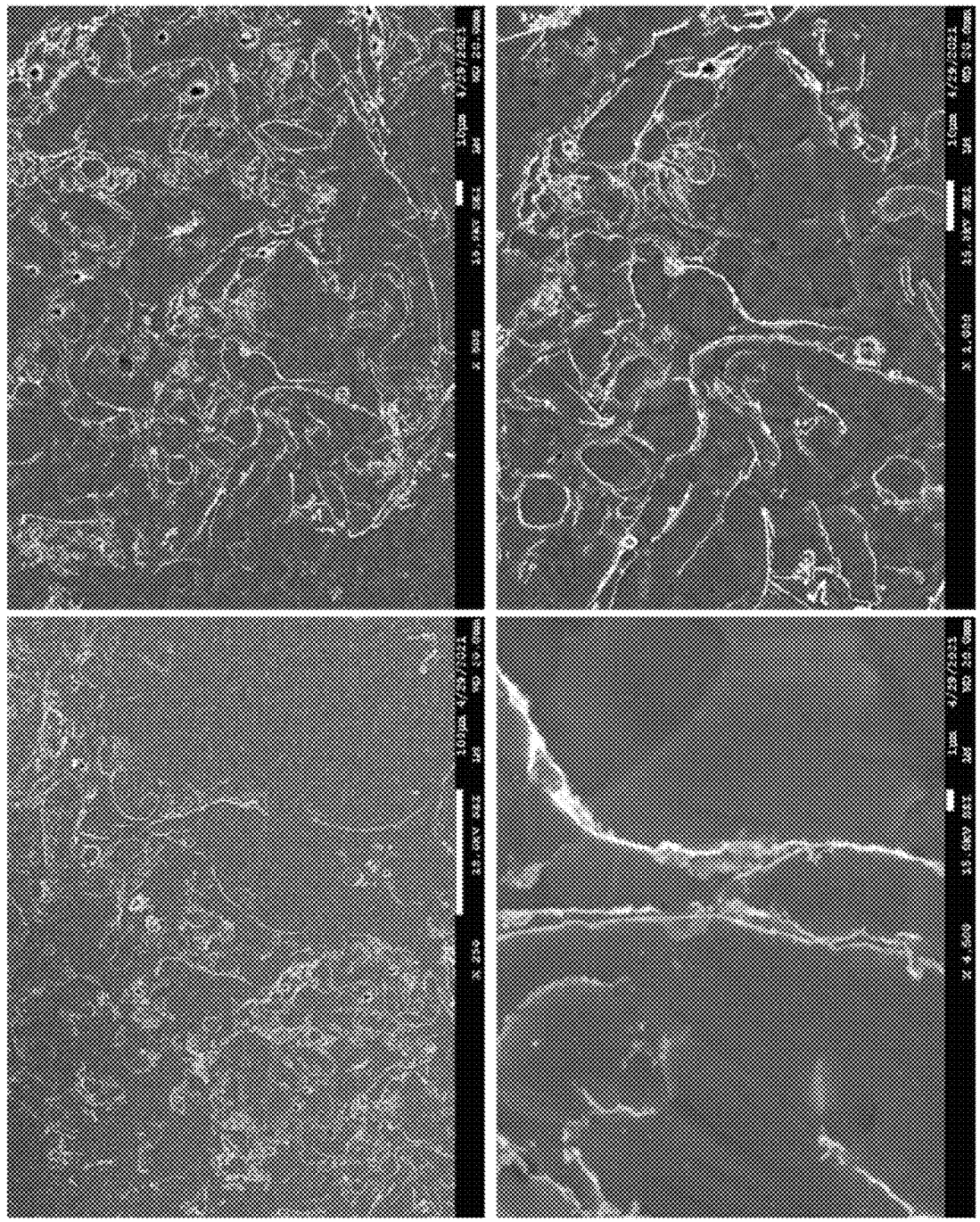
FIG. 11 depicts various micrograph views of the development of eutectic phases during solidification of various alloys.

Referring next to FIG. 11, SEM micrographs that depict eutectic phases for both as-deposited and heat-treated samples are shown. In particular, the formation of bright phases around the grain boundary in some regions of the microstructure can be seen. High magnification images show the continuous formation of these bright phases at grain boundaries. Several intermetallic phases such as $Mg_3Gd$, $Mg_3(Nd,Er)$, $Mg_{24+x}(Y,Er)_5$, $Mg_{41}(Nd,Er)_5$ and $Mg_{45.9}Gd_{9.08}$ can form eutectic with the primary Mg phase. Although eutectic phases are shown generally, the authors of the present disclosure believe that the use of higher magnification images and unetched specimens would better emphasize the nature of such eutectics; such could be performed with high-resolution SEM/TEM or other etchants that would avoid removal of the phases. Despite these potential improvements associated with changing one or both of these parameters, it can be discerned from the micrographs of FIG. 10 that eutectics are present.

Figure 12:
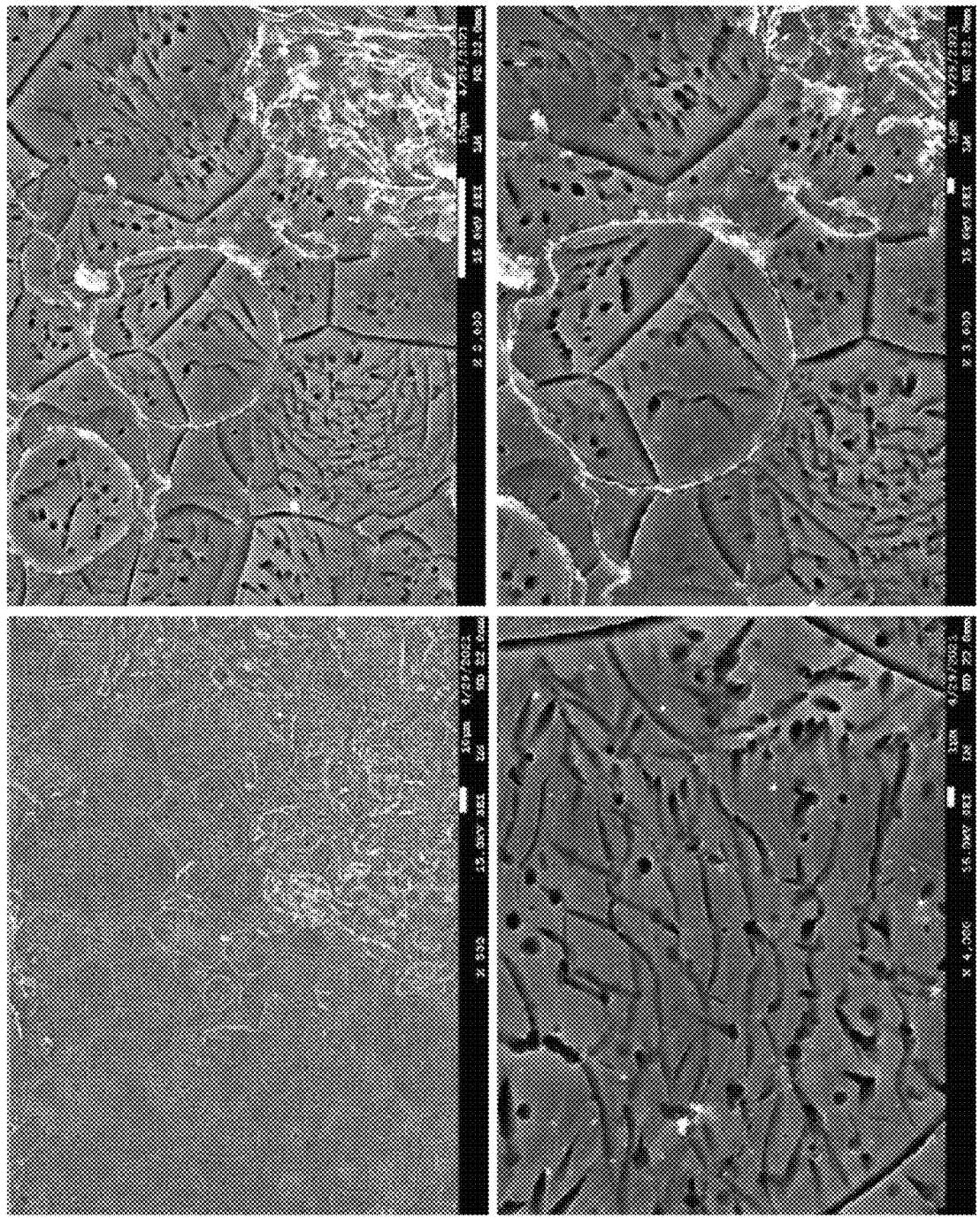
FIG. 12 depicts various micrograph views of one of the heat-treated alloys showing the presence of Y and Er phases at grain boundary regions.

Referring next to FIG. 12, SEM investigation of heat-treated Alloy 9 shows the presence of bright Y and Er rich phases at grain boundary regions, as well as an increase in grain size due to heat treatment. EDS investigation on this microstructure shows the presence of nano-size Zr-rich precipitate forming close to the grain boundary. Although not shown, there is a clear segregation of Y and Er at the grain boundary.

Figure 13:
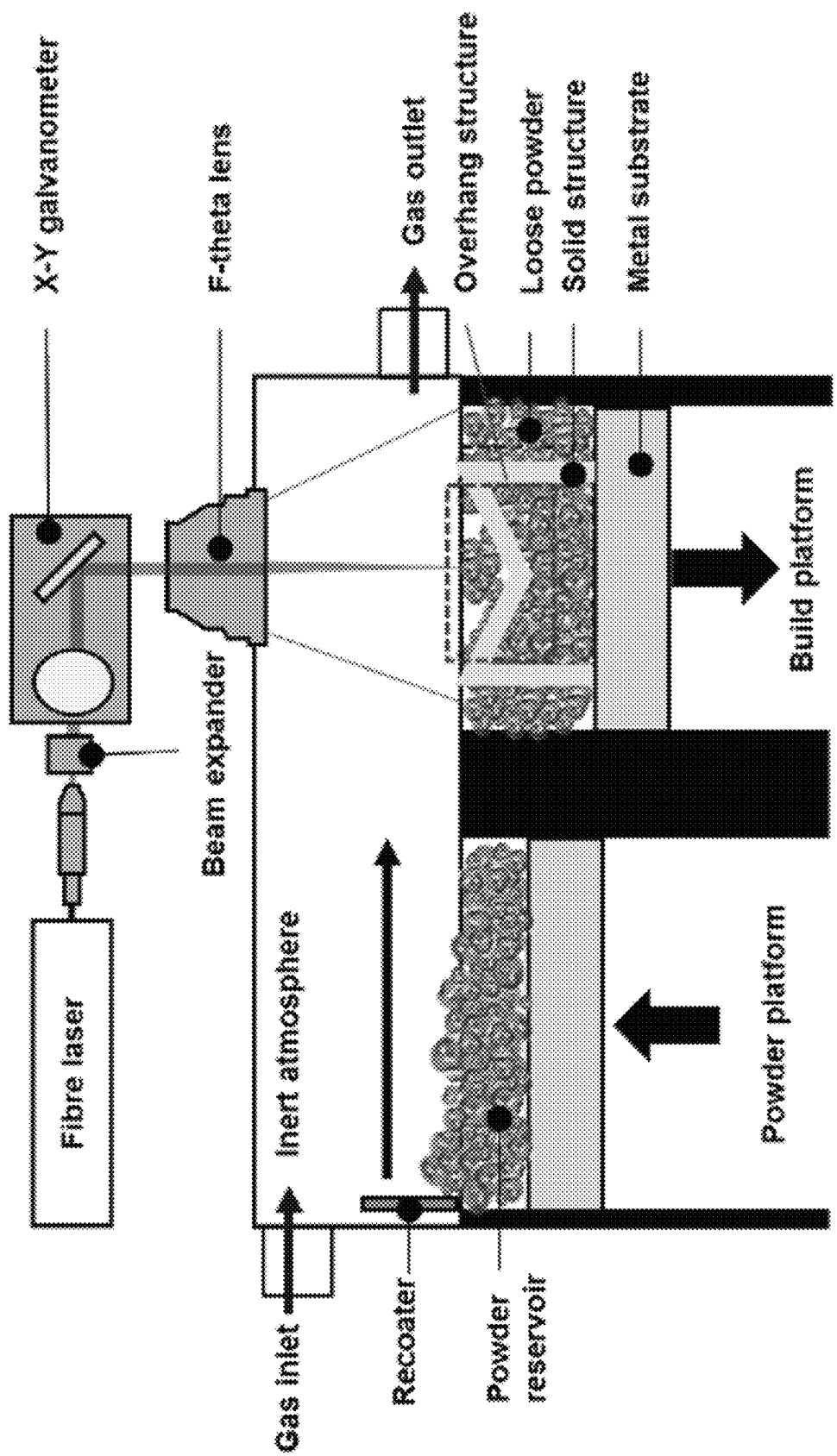
FIG. 13 depicts a schematic of laser powder bed fusion (LPBF) process that may be used to create the Mg alloys disclosed herein.

Referring next to FIG. 13 in conjunction with FIG. 1, although it is the DED process that is depicted in FIG. 1, the authors of the present disclosure have discovered that DMLS, SLM and SLS may be used to produce the Mg-based alloys disclosed herein. In particular, a schematic of the LPBF/SLM process is shown, where the laser-based heat source is applied to particles contained within a powder bed (often in an inert atmosphere) such that a layer-by-layer buildup occurs. This process is particularly beneficial for use in high-value components, particularly those with complex geometries and relatively low production volume, such as airfoils for gas turbine engines. When an energy source (such as a laser) 110 is used, different radii are defined for the size of the concentrated energy beam 120 and the melt zone. Likewise, along the direction of the beam, the deposited material (for example, in powder form) is impacted by the concentrated energy beam 120 such that subsequent processing and sintered layers are defined. Within the region between the processing and sintered layers, the material may take on various forms, including molten, re-melted and solidified.

Within the present disclosure, one or more of the following claims may utilize the term "wherein" as a transitional phrase. For the purposes of defining features discussed in the present disclosure, this term is introduced in the claims as an open-ended transitional phrase that is used to introduce a recitation of a series of characteristics of the structure and should be interpreted in like manner as the more commonly used open-ended preamble term "comprising" and its variants that do not preclude the possibility of additional acts or structures.

Within the present disclosure, terms such as "preferably", "generally" and "typically" are not utilized to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represents the degree by which a quantitative representation may vary from a stated reference without resulting in a change in the basic function of the subject matter at issue.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together.

Within the present disclosure, the following claims are not intended to be interpreted based on 35 USC 112(f) unless and until such claim limitations expressly use the phrase "means for" or "steps for" followed by a statement of function void of further structure. Moreover, the corresponding structures, materials, acts and equivalents of all means or step plus function elements in the claims below are intended to include any structure, material or act for performing the function in combination with other claimed elements as specifically claimed.

Within the present disclosure, the singular forms "a," "an" and "the" include plural references unless the context clearly dictates otherwise. The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9 to 1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6 to 9, the numbers 7 and 8 are contemplated in addition to 6 and 9, and for the range 6.0 to 7.0, the number 6.0, 6.1, 6.2, 6.3, 6.4, 6.5, 6.6, 6.7, 6.8, 6.9 and 7.0 are explicitly contemplated.

The present description is for purposes of illustration and is not intended to be exhaustive or limited. Many modifications and variations will be apparent to those of ordinary skill in the art without departing from the scope and spirit of the present disclosure. Aspects of the present disclosure were chosen and described in order to best explain the principles and practical applications, and to enable others of ordinary skill in the art to understand the subject matter contained herein for various embodiments with various modifications as are suited to the particular use contemplated.

Unless otherwise defined, all technical and scientific terms used herein that relate to materials and their processing have the same meaning as commonly understood by one of ordinary skill in the art. In case of conflict, the present document, including definitions, will control. For example, any term related to aging and an aging temperature refers to an elevated temperature at which an alloy is kept for heat treatment where such heat treatment may suitably induce a precipitation reaction. In some embodiments, the heat treatment may be conducted at two distinct temperatures for two distinct times. Likewise, any term related to yield strength refers to the stress level at which plastic deformation begins.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An additive manufacturing magnesium alloy with between about 10% and 15% of a tear-resistant transient Laves phase and a precipitated Laves phase-free structure, the additive manufacturing magnesium alloy consisting essentially of, by weight:
   about 0% to about 6% neodymium;
   about 0% to about 1% zirconium;
   about 0% to about 8% yttrium;
   about 0% to about 16% erbium;
   about 0% to about 16% calcium;
   about 0% to about 1% gadolinium;
   about 0% to about 1% manganese; and
   a balance of magnesium and incidental elements and impurities such that when at least a portion of a deposited layer of the additive manufacturing magnesium alloy undergoes rapid solidification from a single liquid phase after having been melted during an additive manufacturing process, at least some of the transient Laves phase is subsequently dissolved through heat treating so that a resultant single-phase magnesium matrix that corresponds to the precipitated Laves phase-free structure is precipitation strengthened.

2. The additive manufacturing magnesium alloy of claim 1, wherein the precipitated Laves phase-free structure comprises an $Mg_{24}R_5$ phase, where R is at least one of calcium, yttrium, erbium and gadolinium.

3. The additive manufacturing magnesium alloy of claim 2, wherein the magnesium alloy contains about 0.8% of soluble Laves phase eutectic and greater than 6% precipitated $Mg_{41}R_5$ phase at about 250° C.

4. The additive manufacturing magnesium alloy of claim 1, wherein the precipitated Laves phase-free structure comprises an $Mg_{41}R_5$ phase, where R is at least one of calcium, yttrium, erbium and gadolinium.

5. The additive manufacturing magnesium alloy of claim 4, wherein the magnesium alloy contains about 0.8% of soluble Laves phase eutectic and greater than 0.1% precipitated $Mg_{41}R_5$ phase at about 250° C.

6. The additive manufacturing magnesium alloy of claim 1, containing greater than 1% of large $\beta'$ and fine $\beta''$-phase precipitate phases, where $\beta'$ is $Mg_{12}$(Y, Nd or Er) and $\beta''$ $Mg_3$(Y, Nd, Er or Gd), respectively, that has been dynamically precipitated at a selected temperature for high strength that proceeds as follows: $\alpha$-Mg$\rightarrow\beta''\rightarrow\beta'\rightarrow\beta$ ($Mg_3R$)$\rightarrow Mg_{24}R_5 \rightarrow Mg_{41}R_5$, where R is at least one of calcium, yttrium, erbium and gadolinium.

7. The additive manufacturing alloy of claim 1, wherein the additive manufacturing alloy consists essentially of, by weight, about 2% Er, about 0.1% calcium, about 5.37% yttrium, 3.337% neodymium, 0.477% gadolinium, about 0.603% zirconium, and the balance of weight is magnesium and incidental elements and impurities.

8. The additive manufacturing alloy of claim 1, wherein the additive manufacturing alloy consists essentially of, by weight, about 5% Er, about 0.1% calcium, about 4.317% yttrium, 2.682% neodymium, 0.383% gadolinium, about 0.485% zirconium, and the balance of weight percent magnesium and incidental elements and impurities.

9. The additive manufacturing alloy of claim 1, wherein the additive manufacturing alloy consists essentially of, by weight, about 8% Er, about 0.1% calcium, about 3.264% yttrium, 2.028% neodymium, 0.290% gadolinium, about 0.366% zirconium, and the balance of weight percent magnesium and incidental elements and impurities.

* * * * *